(12) United States Patent
Kominsky

(10) Patent No.: US 8,164,761 B2
(45) Date of Patent: Apr. 24, 2012

(54) DIFFERENTIAL FOCUS BLADE CLEARANCE PROBE AND METHODS FOR USING SAME

(75) Inventor: Daniel Kominsky, Christiansburg, VA (US)

(73) Assignee: Prime Photonics, LC, Blacksburg, VA (US)

( * ) Notice: Subject to any disclaimer, the term of this patent is extended or adjusted under 35 U.S.C. 154(b) by 359 days.

(21) Appl. No.: 12/604,860

(22) Filed: Oct. 23, 2009

(65) Prior Publication Data

US 2010/0168981 A1 Jul. 1, 2010

Related U.S. Application Data

(60) Provisional application No. 61/197,196, filed on Oct. 24, 2008.

(51) Int. Cl.
*G01B 11/02* (2006.01)
(52) U.S. Cl. ........ 356/635; 356/630; 356/620; 356/624; 356/609; 250/559.22
(58) Field of Classification Search .................. 356/635, 356/620, 630, 609; 250/559.22
See application file for complete search history.

(56) References Cited

U.S. PATENT DOCUMENTS

| | | | |
|---|---|---|---|
| 4,049,349 A | 9/1977 | Wennerstrom | |
| 4,180,329 A | 12/1979 | Hildebrand | |
| 4,326,804 A | 4/1982 | Mossey | |
| 4,357,104 A | 11/1982 | Davinson | |
| 4,596,460 A | 6/1986 | Davinson | |
| 5,017,796 A | 5/1991 | Makita | |
| 7,027,166 B2 * | 4/2006 | Luetche et al. | 356/615 |
| 7,271,919 B2 * | 9/2007 | Schick | 356/609 |
| 8,009,939 B2 * | 8/2011 | Zheng et al. | 385/12 |
| 2010/0177299 A1 * | 7/2010 | Kominsky | 356/5.01 |

* cited by examiner

*Primary Examiner* — Tarifur Chowdhury
*Assistant Examiner* — Isiaka Akanbi
(74) *Attorney, Agent, or Firm* — The H.T. Than Law Group

(57) ABSTRACT

An apparatus and a method for ascertaining a gap between a stationary member and a rotating member are disclosed. At least a reference beam and a signal beam, which have different focal lengths or which diverge/converge at different rates, are fixed to the stationary member and proximate to each other. The beams are projected across a gap between the stationary member and the rotating member toward the rotating member. The reference and signal beams are reflected by the translating member when it intersects the reference and signal beam, and the reflected reference and signal pulses are obtained. One or more features of the reflected reference pulse and the reflected signal pulse, such as a rise time of the pulses, a fall time of the pulses, a width of the pulses and a delay between the reflected reference pulse and the reflected signal pulse, among other factors, are obtained. The width of the gap is obtained using at least one of these factors.

21 Claims, 17 Drawing Sheets

DIFFERENTIAL FOCUS BLADE CLEARANCE PROBE AND METHODS FOR USING SAME

CROSS-REFERENCE TO RELATED APPLICATIONS

The present application claims priority under 35 U.S.C. §119(e) to U.S. provisional patent application Ser. No. 61/197,196 entitled "Differential Focus Blade Clearance Probe (DFCP)" filed on Oct. 24, 2008, which is incorporated by reference herein in its entirety.

STATEMENT REGARDING FEDERALLY SPONSORED RESEARCH OR DEVELOPMENT

This invention was made with government support under U.S. Army contract nos. W911W6-08-C-0011 and W911W6-08-C-0058 awarded by the Department of the Army. The Government of the United States of America may have certain rights to this invention.

FIELD OF THE INVENTION

This invention generally relates to a differential focus probe that measures the distance between a translating member and a stationary member, such as the distance between the shroud of a jet engine and the edge of a rotating blade, and a method for measuring such distance.

BACKGROUND OF THE INVENTION

Measurement of blade clearance in the turbine stages of a gas turbine engine, jet engine or any other turbo-machines and turbines is an important step towards reducing maintenance and improving the thermodynamic efficiency and thrust output of the engine. Any gas which travels between the blade tips and the engine shroud represents a significant loss of energy from the system, lowering thrust and requiring the consumption of additional fuel. Thus, it is desirable for these reasons to minimize the clearance of the blades. Doing so, however, runs the risk of a catastrophic failure occurring if the blades impact the engine shroud. It is desirable, therefore, to know how much clearance is present and to utilize that data to maintain a minimal, yet safe, clearance. Once this information is available, it can be applied as the driver for a suite of active control technologies, such as vibration cancellation, adaptive modification of the housing diameter, or emergency shutdown to prevent catastrophic failure.

The patent literature discloses several attempts to measure rotor tip clearance in turbo-machineries. U.S. Pat. No. 4,049,349 to A. J. Wennerstrom discloses a measuring device comprising a pair of optical sensors aimed at the rotating blades, and a single sensor aimed at the rotating shaft. Each sensor comprises a light emitter and a light detector. The pair of optical sensors aiming at the rotating blades is spaced a short distance apart, and their light emitters project light beams at an angle to one another. A digital clock comprising a signal generator producing a stable frequency is used as a timing device for the system. The light beams aimed at the rotating blades are reflected and scattered by passing blades. As a rotating blade intercepts the first light beam, its reflected light starts a counter associated with the digital clock. As this rotating blade intercepts the second light beam from the pair, its reflected light stops the counter. The sensor aiming at the rotating shaft starts and stops another counter recording the number of cycles or pulses from the digital clock, which occurred during one revolution of the shaft. By dividing the number of counts measured by the pair of sensors aiming at the rotating blades by the number of counts during one revolution, the rotor tip clearance is ascertained.

U.S. Pat. No. 4,326,804 to P. W. Mossey discloses another tip clearance measuring device that comprises a single light emitter and a single light receiver. The emitted light impinges the rotating blades at an angle. The reflected light is focused on to a position detector. The tip of the rotating blade reflects light at varying angles as a function of the tip clearance. The angles of the reflected light are detected by the position detector, and the tip clearance is derived from said angles.

U.S. Pat. No. 5,017,796 to H. Makita also discloses a tip clearance measuring device with a single light emitter and a single light receiver. This device has a holding spring that biases a movable focusing lens to focus the emitted light on to the moving blade. The movable lens is adjusted by oscillating movement until the reflected light has a maximum value. The tip clearance is related to the position of the movable lens at the maximum value of the reflected light.

U.S. Pat. No. 4,357,104 to I. Davinson passes light through an astigmatic lens which changes the shape of the beam to measure the tip clearance. U.S. Pat. No. 4,596,460 to I. Davinson uses an optical triangulation technique using a T-shaped optical path to measure tip clearance. U.S. Pat. No. 4,180,329 to J. R. Hildebrand discloses a single blade proximity probe using two light beams having different frequencies. The two light beams are mixed prior to being projected towards the blades, and the reflected signal is subtracted by the frequency of the second light beam.

However, the prior art does not contemplate using the geometrical shape and features of the emitted light or lights to measure tip clearance.

SUMMARY OF THE INVENTION

Hence, the invention is generally directed to a method and a device to measure the distance between the edge of a translating member, e.g., a rotating blade member, and a stationary second member, e.g., an engine shroud.

The present invention includes a sensor and a method for ascertaining a gap between a stationary member and a rotating member.

One embodiment of the present invention provides a method for ascertaining a gap between a stationary member and at least one translating member of a rotary machine. This method comprises the steps of (i) associating at least a reference beam and a signal beam of electromagnetic radiation to the stationary member and proximate to each other, wherein one of the two beams either converges or diverges at a rate which is different than that of the other beam, (ii) projecting the reference beam and the signal beam across a gap between the stationary member and the at least one translating member toward the at least one translating member, (iii) receiving a reference and signal pulse reflected by the at least one translating member when it intersects the reference and signal beam, respectively, (iv) ascertaining one or more geometrical features from the reflected reference pulse and the reflected signal pulse; and (v) determining a width of the gap using at least one of the features in step (iv).

Another embodiment provides another method of determining this gap where only one the signal beam is deployed, and the speed and thickness of the at least one translating member are provided.

Another embodiment of the present invention is directed toward a sensor comprising at least a first and second beams of light mounted on a stationary member and directed across a gap toward at least one translating member. The first beam of light is focused by a first lens and the second beam of light is focused by a second lens, such that the diameter of the second beam of light across the gap is known. The light from the first beam of light and the second beam of light either diverges or converges at different rates, and the width of the gap is determinable by using reflected light pulses produced by the interception of the light beams by the at least one translating member.

Three or more beams of light can be used with the present invention. Furthermore, the sensors of the present invention can be used in a control loop application.

In another embodiment, the sensor can be constructed of materials that survive high temperatures, so that it can be used at high temperatures, for example in gas turbine engines.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

The present invention relates to using the varying diameter of a signal light beam to measure the tip clearance between a stationary member of a turbo-machine, such as a housing or a shroud, and a moving or translating member, such as rotating blades. In one embodiment, the signal light beam is a converging beam positioned on the stationary member and is directed toward the translating member across the gap between the two members, such as the tip clearance. Since the diameter of the signal light beam is decreasing and unique along a certain distance from the stationary member to the translating member, when a rotating blade intersects the signal light beam, it produces a unique pulse that is related to the tip clearance of that rotating blade. A reference light beam having a known and preferably constant diameter can also be used in conjunction with the focused signal beam. Since the signal beam and the reference beam intersect the same rotating blade, ratios of certain aspects of the pulses reflected from the signal beam to the reference beam, such as pulse widths, rise time and fall time, among others, produce the tip clearance independent of the rotating speed and the width of the blades.

Figure 1:
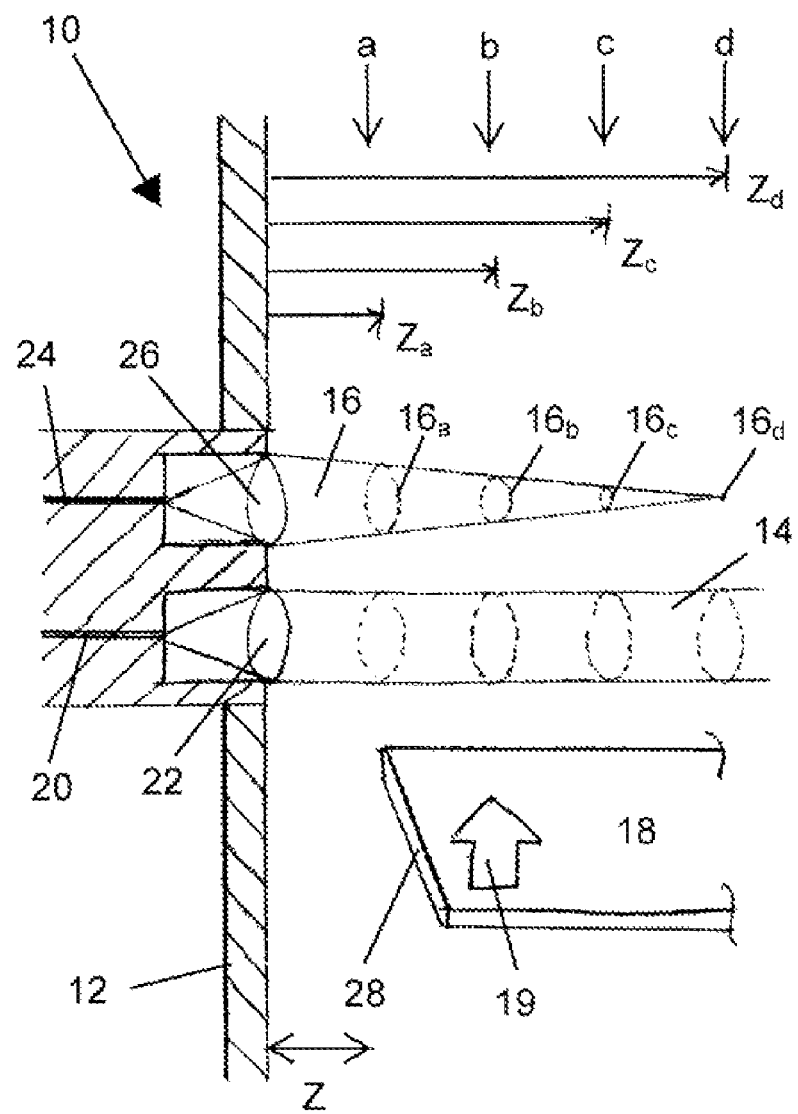
FIG. 1 is a schematic cross-sectional view of an embodiment of the sensor of the present invention.
Figure 2:
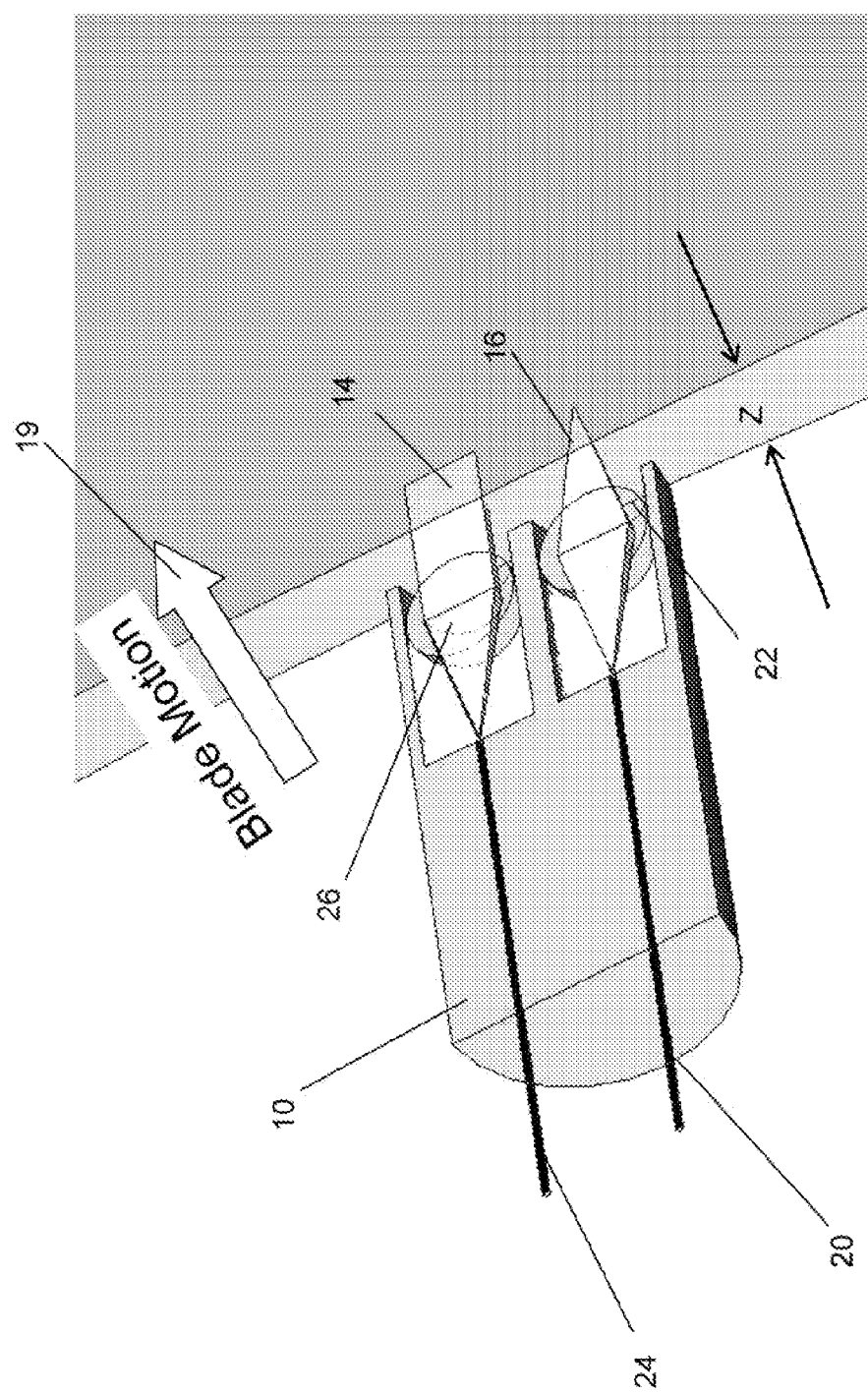
FIG. 2 is a three-dimensional cross-sectional view of the embodiment of FIG. 1 viewed from a different angle.

In one embodiment, the present invention comprises remote, non-contact optical probe 10, shown in FIGS. 1 and 2, designed to measure the space or clearance "Z" between a moving or translating member and a stationary member, such as the tips of moving blades or airfoils inside a jet engine or other turbo-machineries and the stationary shroud or housing surrounding and protecting the moving blades or airfoils. Generally, the differential focus blade clearance probe, designated herein as probe 10, comprises two or more beams of light: a reference beam and a signal beam, which are mounted on the stationary member and are directed toward the tips of the moving or translating members. The beams are positioned substantially parallel, and preferably positioned toward the axis of rotation of the translating members and proximate to each other. The reference beam is preferably, although not necessarily, as explained further below, collimated so that its diameter remains constant at least across gap Z from the stationary member to the moving or translating member. The signal beam is preferably focused so that its diameter varies as the beam travels across gap Z. In other words, the reference beam and the signal beam have different focal lengths. The reference beam can be converging, collimated or diverging, and the signal beam can be converging or diverging.

In the preferred embodiment discussed in the preceding paragraph, as the moving or translating member, e.g., a blade or airfoil, moves across the two beams, it reflects light differently. The reflected reference beam should have the same pulse notwithstanding the width of gap or distance Z, since the reference beam is collimated. The reflected signal beam produces a pulse that varies in time duration depending on the width of gap Z, since the signal beam is focused. When gap Z is relatively small, the reflected signal pulse is relatively longer. When gap Z is relatively large, the reflected signal pulse is relatively smaller since the focused signal beam is smaller when the further the signal beam is away from the stationary member. As described further below, ratios of certain features of the reference pulse and signal pulse, where the translating member intersects the beams, are indicative the width of gap Z.

Referring to FIG. 1, differential focus blade clearance probe 10 is mounted on stationary member 12 and comprises reference beam 14 and signal beam 16. Beams 14 and 16 are located proximate and are substantially parallel to each other, and are directed toward rotating or moving or translating member 18, hereinafter referred to as blade 18, which is moving along the indicated arrow 19 toward beams 14 and 16. Reference beam 14 is produced by a light propagating along optical fiber 20 and through collimating lens 22. Signal beam 16 is produced by a light propagating along optical fiber 24 and is focused by focusing lens 26. For low temperature applications, optical fibers 20 and 24 can be omitted and the light beams can be projected directed from a light source, such as lasers or diodes. A window 27, shown schematically in FIGS. 14 and 15, downstream of lenses 22 and 26 and located at the distal end of sensor 10 is preferably provided to protect sensor 10 from debris. Any light sources can be used in the present invention. Preferably, light with narrowed frequency ranges, such as light produced by lasers or diodes, is used. However, broad band light sources can also be used, because the present invention functions independent of the frequency of the light sources. Similarly, electromagnetic waves in the invisible or visible ranges can be used. As used herein, "light," "light sources," "beam," "light beams" or similar terms include electromagnetic waves or a ray of electromagnetic waves in the invisible and visible ranges, and can be either coherent or incoherent.

Figure 3:
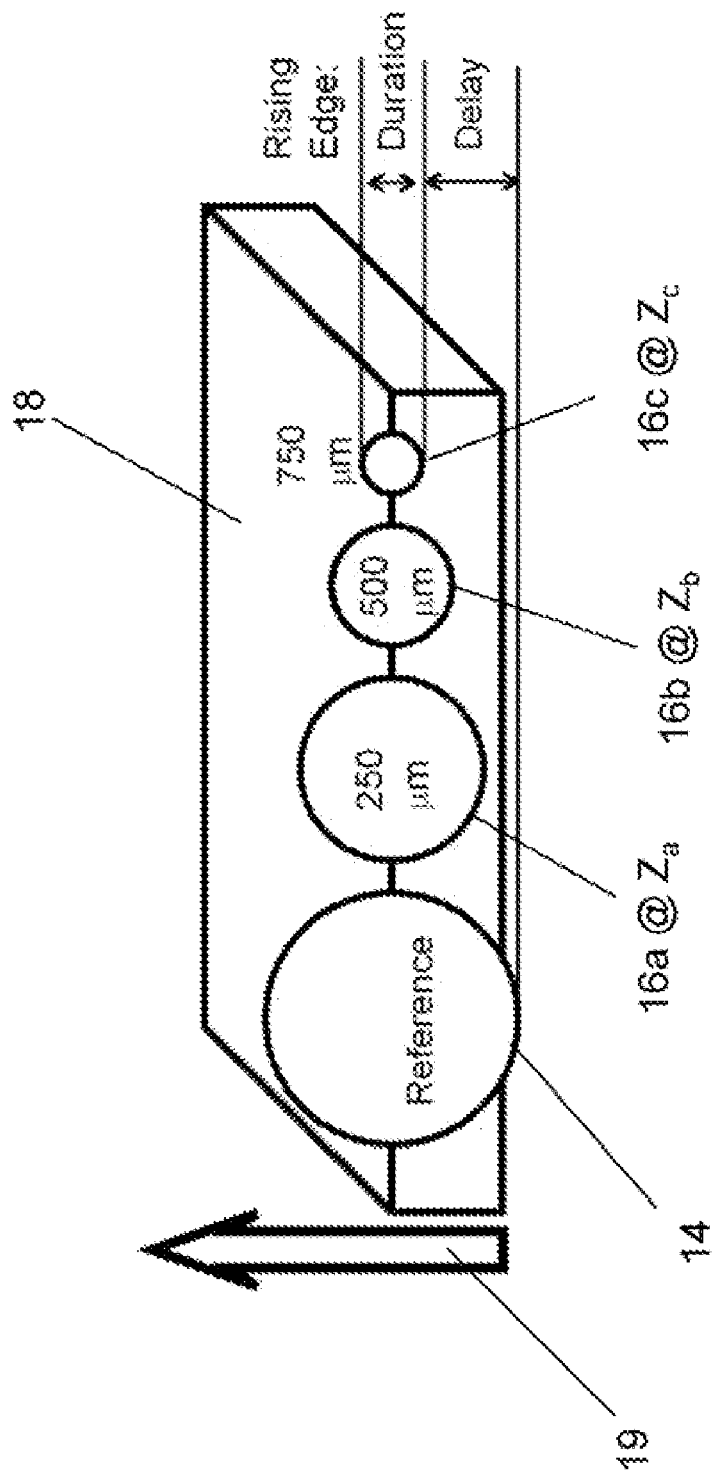
FIG. 3 shows exemplary sizes of the spots at three different clearances projected on the tip of a moving or translating part, such as a turbine blade.

As tip 28 of blade 18 intersects beams 14 and 16, it reflects the light back to sensor 10. When the rotating speed of blade 18 remains constant, blade 18 would reflect a pulse of light of the same dimension or duration from reference beam 14 regardless of its gap Z from stationary member 12. However, as blade 18 intersects signal beam 16, it would reflect a pulse of light of varying dimension or duration depending on gap Z. For example, if blade 18 intersects signal beam 16 at position 16a, then the distance from its tip 28 to stationary member 12 is Za; if blade 18 intersects signal beam 16 at position 16b, then the distance from its tip 28 to stationary member 12 is Zb; and so on. The width of gap Z at Za-Zd is inversely proportional to the dimension or time duration of the reflected signal beam as evidenced by the diameter of signal beam 16 at locations 16a-16d, respectively, as shown in FIGS. 1 and 3. Location 16d, where signal beam 16 converges to a single point, is preferably positioned beyond gap Z, so that tip 28 of blade 18 intersects signal beam 16 upstream of location 16d.

As blade 18 begins to enter reference beam 14, tip 28 begins to partially reflect beam 14 until the entire beam is reflected by blade 18, when tip 28's width and surface are the same or larger than the diameter of reference beam 14. As blade 18 begins to exit the beam, it is reflecting less of the beam until blade 18 completely exits beam 14. Signal beam 16 and reference beam 14 are preferably arranged such that the same portion of tip 28 passes through the center of both beams in sequence, as shown in FIG. 1. Alternatively, blade 18 can substantially concurrently enter and exit reference beam 14 and signal beam 16, as illustrated in FIG. 2. Blade 18 may enter signal beam 16 ahead or behind reference beam 14.

Figure 4:
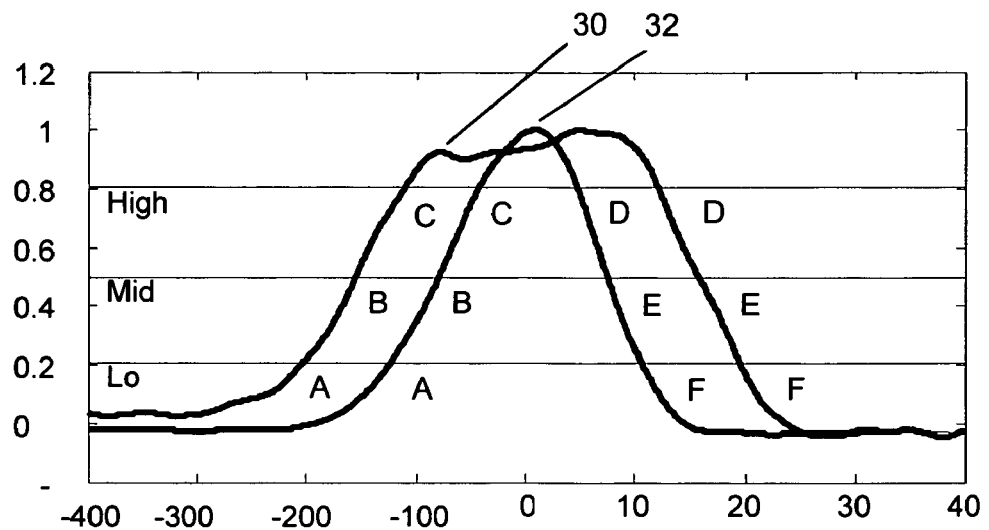
FIG. 4 is a plot of a pair of pulses including a reflected reference pulse and a corresponding reflected signal pulse.
Figure 6:
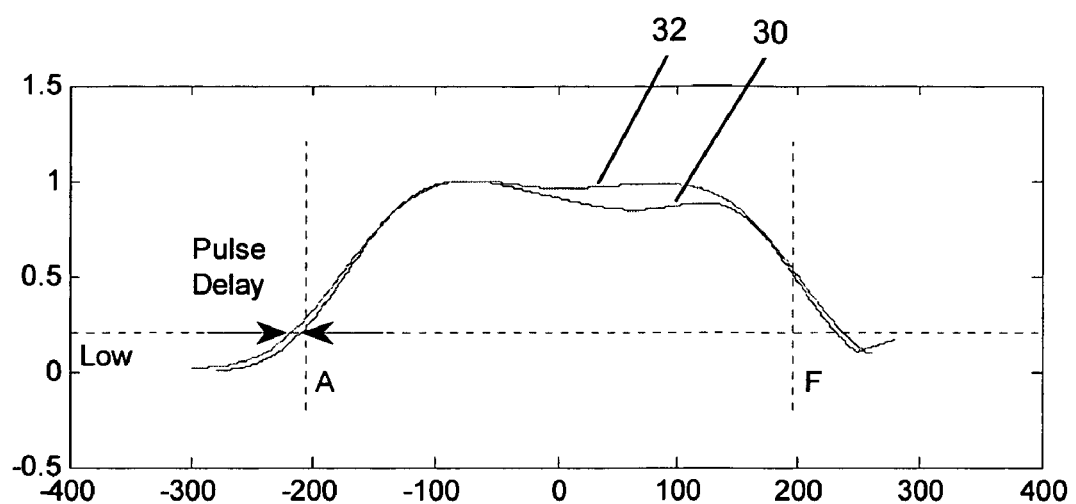
FIG. 6 is a plot of a pair of corresponding reference and signal pulses showing the pulse delay between the two pulses with the horizontal time scale adjusted for clarity.

Referring to FIG. 4, a plot showing an exemplary reflected reference pulse 30 from reference beam 14 and an exemplary reflected signal pulse 32 are shown. The pulses are normalized to 1.0, which is shown on the vertical axis. The horizontal axis represents the time duration of the pulses in microseconds (µs) centered about the peak of reflected signal pulse 32 for convenience. The reflected pulses are also time shifted as shown in FIGS. 4 and 6 for clarity, since in the preferred embodiment discussed in the preceding paragraph the reflected pulses are generated sequentially to minimize crosstalk when they are detected. The left rise portions of reflected pulses 30 and 32 are designated as the rise time and commensurate with the partial reflections of beams 14 and 16, as blade 18 is entering the beams. The right fall portions of reflected pulses 30 and 32 are designated as the fall time and commensurate with the partial reflections of beams 14 and 16, as blade 18 is exiting the beam. The plateau between the rise and fall time, if any, represents the time duration when the entire beam 14 or 16 is reflected from blade 18. As expected, the width of reflected signal pulse 32 is smaller than the width of reflected reference pulse 30 due to the fact that the diameter of signal beam 16 is narrowing while the diameter of reference beam 14 remains substantially constant, as shown in FIGS. 1 and 2.

Figure 5:
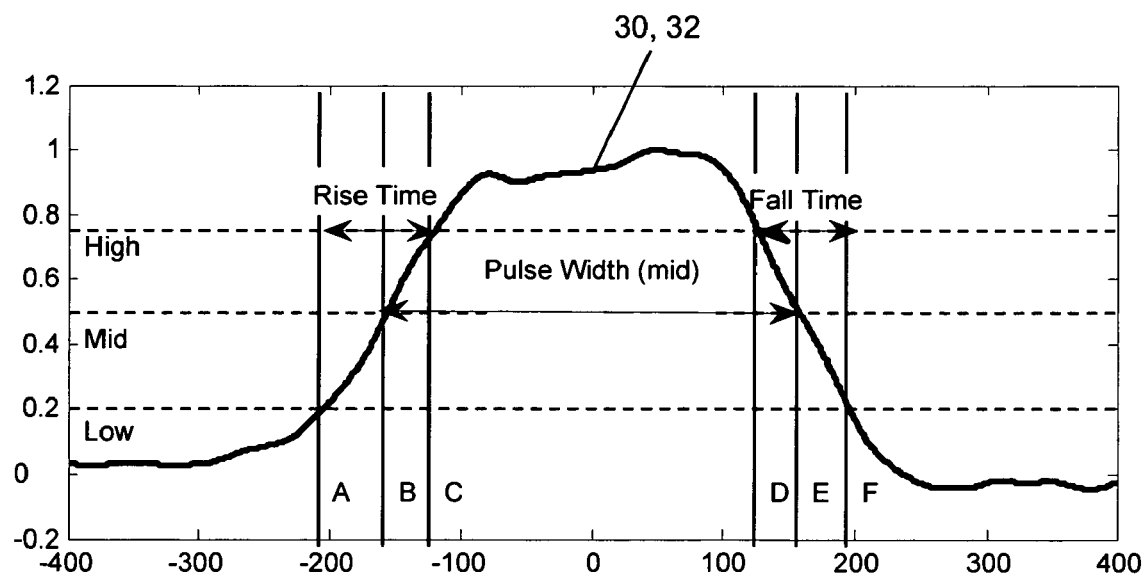
FIG. 5 is a plot of a single pulse, e.g., the reference pulse shown in FIG. 4, illustrating the rise and fall crossing time lines for three thresholds.

Referring to FIG. 5, to aid in the determination of rise time, the left rise portions of the reflected pulses is marked at A, where the amplitude of the pulse is about 25% of the maximum height, at B, where the amplitude of the pulse is about 50% of the maximum height and at C, wherein the amplitude is about 75% of the maximum height. Similarly, to aid in the determination of fall time, the right fall portions of the reflected pulses is marked at D, where the amplitude of the pulse is about 75% of the maximum height, at E, where the amplitude of the pulse is about 50% of the maximum height and at F, wherein the amplitude is about 25% of the maximum height. Alternatively, the low marker A or F can be set between about 15% and about 35%; the mid marker B or E can be set between about 40% and about 60%; and the high marker C or D can be set between about 65% and about 85%.

It is noted that the rise and fall portions of the reflected pulses can be divided or marked at any number of intervals and at any percentage of the maximum value, and the present invention is not limited thereto.

Alternatively, instead of normalizing the pulses based on their amplitude, the pulses can be normalized based on the total pulse energy. In one embodiment, the area under the pulse is divided up into an "n" number of segments, then the values for all the segments are added up and then divided by the "n" number of segments. This average value can be used to determine the High, Mid, and Low thresholds. In another embodiment, the area under the pulses is integrated and the integrated area is used to determine the markers. For example, a partial area making up about 10% of the integrated area above the X-axis demarcates markers A and F, a partial area making up about 25% cumulatively of the integrated area above the X-axis demarcates markers B and E, and so on.

To ascertain the distance or gap Z between stationary member 12 and tip 28 of moving or translating member 18, rise time, T(rise), for both reflected pulses 30 and 32 are derived as follows:

$$T_{(rise-ref)}30 = T(C) - T(A) \text{ of reflected reference pulse } 30, \quad \text{(Eq. 1)}$$

$$T_{(rise-signal)}32 = T(C) - T(A) \text{ of reflected signal pulse } 32, \quad \text{(Eq. 2)}$$

$$T_{(rise-ref)}30 = D(14)/\text{velocity of blade } 18 \quad \text{(Eq. 3)}$$

$$T_{(rise-signal)}32 = D(16)/\text{velocity of blade } 18 \quad \text{(Eq. 4)}$$

In Eq. 3, the diameter of reference beam 14, D(14), is constant, and is known or can be determined. The diameter of signal beam 16, D(16), at the location where tip 28 intersects signal beam is directly related to distance or gap Z. Furthermore, the velocity of blade 18 in both Eqs. 3 and 4 is also known and is generally the product of the rotational speed of blade 18 multiplied by the distance from tip 28 to the axis of rotation and can be readily determined, when blade flexure is minimal. However, a ratio of the rise time eliminates the velocity component, as follows.

$$T_{(rise\text{-}signal}32)/T_{(rise\text{-}ref}30)=D(16)/D(14) \quad (Eq.\ 5).$$

Since, Z is inversely proportional to D(16) as discussed above and D(14) is constant, (Eq. 5) can be simplified and inverted, as follows $$Z\alpha Z_d - D(16)/D(14) \quad (Eq.\ 6),$$

where proportionality is represented by the symbol $\alpha$, and $Z_d$ is the distance shown in FIG. 1. Diameter D(16) of signal beam 16 varies along gap Z, as discussed above, and the amount of variation of D(16) depends on the optical properties of focusing lens 26 and the fiber 24 to lens 26 spacing, which are controlled by the users or designers of sensor 10. Hence, D(16) is also known. Hence, the width of gap Z is known, when D(16) is known, as shown in (Eq. 6). The duration of reflected pulses can be affected by the thickness of blade 18 and the speed of tip 28, because thicker blade 18 would produce pulses of longer duration and the faster speed of tip 28 would produce a shorter duration. Since the blade speed has the same contribution in Eqs. 3 and 4, the blade speed is canceled in Eqs. 5 and 6. By substituting (Eq. 5) into (Eq. 6), gap Z can be defined as.

$$Z\alpha T_{(rise\text{-}ref}30)/T_{(rise\text{-}signal}32) \quad (Eq.\ 7),$$

The rise times of reflected signal pulse 32 and reflected reference pulse 30 can be readily determined from the reflected pulses, as shown in FIGS. 4 and 5. In one embodiment, the rise time can be defined as the time at point C or T(C) minus the time at point A or T(A) of reflected reference or signal pulse.

Similarly, gap Z is also proportional to a ratio of the fall time of reflected signal pulse 32 to the fall time of reflected reference time 30, or $Z\alpha T_{(fall\text{-}signal)}/T_{(fall\text{-}ref)}$. More specifically, $Z\alpha(T(F)-T(D)_{(ref}30))/(T(F)-T(D)_{(signal}32))$ (Eq. 8).

Gap Z is also proportional to a ratio of the width (W) of the signal pulse 32 at low threshold to the width of the reference pulse 30 at low threshold, $Z\alpha W_{(low\text{-}ref}30)/W_{(low\text{-}signal}32)$. More specifically, $Z\alpha(T(F)-T(A)_{(ref}30))/(T(F)-T(A)_{(signal}32))$ (Eq. 9). Since the width (W) of the signal is affected by the width of tip 28 or of blade 18, preferably a constant is added to both signal pulse 32 and reference pulse 30. This constant is related to the width of tip 28. One manner in which this constant may be determined is by comparing the ratio of the widths at different levels. For example, the width of tip 28 will have the same effect on the value (T(C)−T(C)(ref 30)) as it will on (T(F)−T(A)(ref 30)).

Gap Z is also proportional to a ratio of the width (W) of the signal pulse 32 at mid threshold to the width of the reference pulse 30 at mid threshold, $Z\alpha W_{(mid\text{-}ref}30)/W_{(mid\text{-}signal}32)$. More specifically, $Z\alpha(T(E)-T(B)_{(ref}30))/(T(E)-T(B)_{(signal}32))$ (Eq. 10).

Gap Z is also proportional to a ratio of the width (W) of the signal pulse 32 at high threshold to the width of the reference pulse 30 at high threshold, $Z\alpha W_{(high\text{-}ref}30)/W_{(high\text{-}signal}32)$. More specifically, $Z\alpha(T(D)-T(C)_{(ref\ signal}30))/(T(D)-T(C)_{(signal}32))$ (Eq. 11).

In accordance with another aspect of the present invention, gap Z is also proportional to the difference between diameter D(14) of reference beam 14 and diameter D(16) of signal beam 16. More specifically, since diameter D(14) of the reference beam 14 is constant when reference beam 14 is collimated, gap Z is proportional to D(14)−D(16). In practice, this is represented by the "Delay" shown in FIG. 3, which is the lag time between when blade 18 enters or exits reference beam 14 and when blade 18 enters or exits signal beam 16 at locations 16c (as shown), 16a, 16b or 16d.

Gap Z, therefore, is also proportional to $T(A)_{(signal}32)-T(A)_{(ref}30)$ or $T(F)_{(signal}32)-T(F)(ref 30)$ (Eq. 12), as shown in FIG. 6. In certain situations, when pulses 30 and 32 are well defined and separated, as illustrated in FIG. 4 the "Delay" can be established between corresponding pairs of points B, C, D or E, as illustrated in FIG. 4.

While gap Z can be determined by any one of the Eqs. (7)-(12), preferably all of the Eqs. (7)-(12) and possibly the other "Delay" equations are solved to ensure the repeatability of the results of gap Z.

Figure 7:
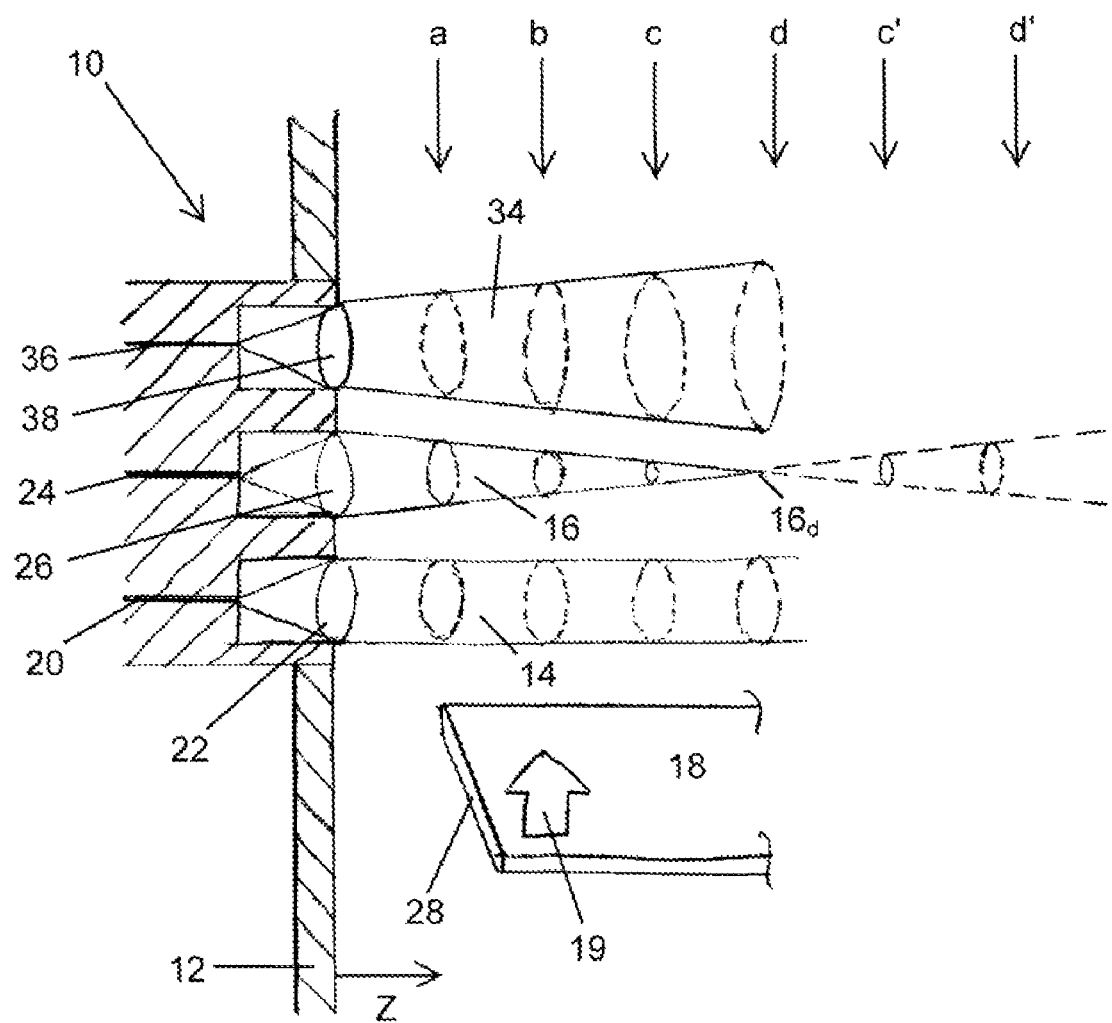
FIG. 7 is a schematic cross-sectional view of another embodiment of the present invention using three or more beams.

Referring to FIG. 7, another embodiment of the present invention is shown. Sensor 10 has three or more beams. In addition to reference beam 14 and signal beam 16, sensor 10 further comprises second signal beam 34, wherein optical fiber 36 carries a light, which is focused through lens 38. Lens 38 may diverge the light beam 34, as shown; however, lens 38 may also focus or converge beam 34, so long the focal length of converging beam 34 is different than that of beams 14 and 16. Also, a diverging beam can also be a converging beam with its point of convergence occurring inside of sensor 10, which would become a diverging beam outside of sensor 10. In general, the beams should converge or diverge at different rates. At positions a, b, c, and d, second signal beam 34 has a unique diameter and therefore would reflect a unique reflected pulse, similar to first signal beam 16 at positions a, b, c and d. The reflections at 34a-34d are proportional to the width of gap Z similar to the reflections at 16a-16d. The determination of gap Z can be accomplished by Eqs. (7)-(12) discussed above. Employing second signal beam 34 in addition to signal beam 16 provides more data to ensure the accuracy and repeatability of the measurements of gap Z. Any number of beams can be used, and the present invention is not limited to any number of beams.

One advantage of using second signal beam 34 is that if gap Z is sufficiently large so that tip 28 of blade 28 is downstream of converging point 16d of signal beam 16, the reflected signal pulse, e.g., at location 16 c', would be similar to the reflected signal pulse 16c and the reflected signal pulse, e.g., at location 16 b', would be similar to the reflected signal pulse 16b. Since the reflected signal pulses from second signal beam 34 are unique or the combinations of reflected pulses from beams 14, 16 and 16 are unique, any ambiguity of gap Z caused by the location of tip 28 relative to converging point 16d is resolved.

In an alternate embodiment, either beam 16 or beam 34 can be the reference beam and the other of beam 16 or beam 34 can be the signal beam, so long as the diameters of both beams are known at any width of gap Z and so long as beams 16 and 34 have different focal lengths. In another alternate embodiment, reference beam 14 can be used with only diverging beam 34 without converging signal beam 16; however, in this embodiment, beam 34 should have sufficient intensity to compensate for the diverging nature of the beam. Alternately, both signal beams 16 and 34 can be converging or diverging, so long as they have different focal lengths.

In yet another embodiment, only one signal beam, such as signal beam 16 or signal beam 34 is used without a reference beam. As discussed above and shown in FIGS. 1 and 7, the diameter of signal beam 16 or 34 is unique for corresponding gap Z. The reflected signal pulse in width and time duration can be unique when the thickness of blade 18 and the speed of blade 18 are known. Gap Z can be ascertained as follows:

$$Z \alpha D(16 \text{ or } 34) \quad (\text{Eq. 6'}),$$

$$Z \alpha T_{(rise\text{-}signal}32) \quad (\text{Eq. 7'}).$$

Eqs. (8)-(12) can be similarly modified for this embodiment. Information about the thickness of blade 18 and its rotating speed can be entered by the user before measuring gap Z.

Figure 8:
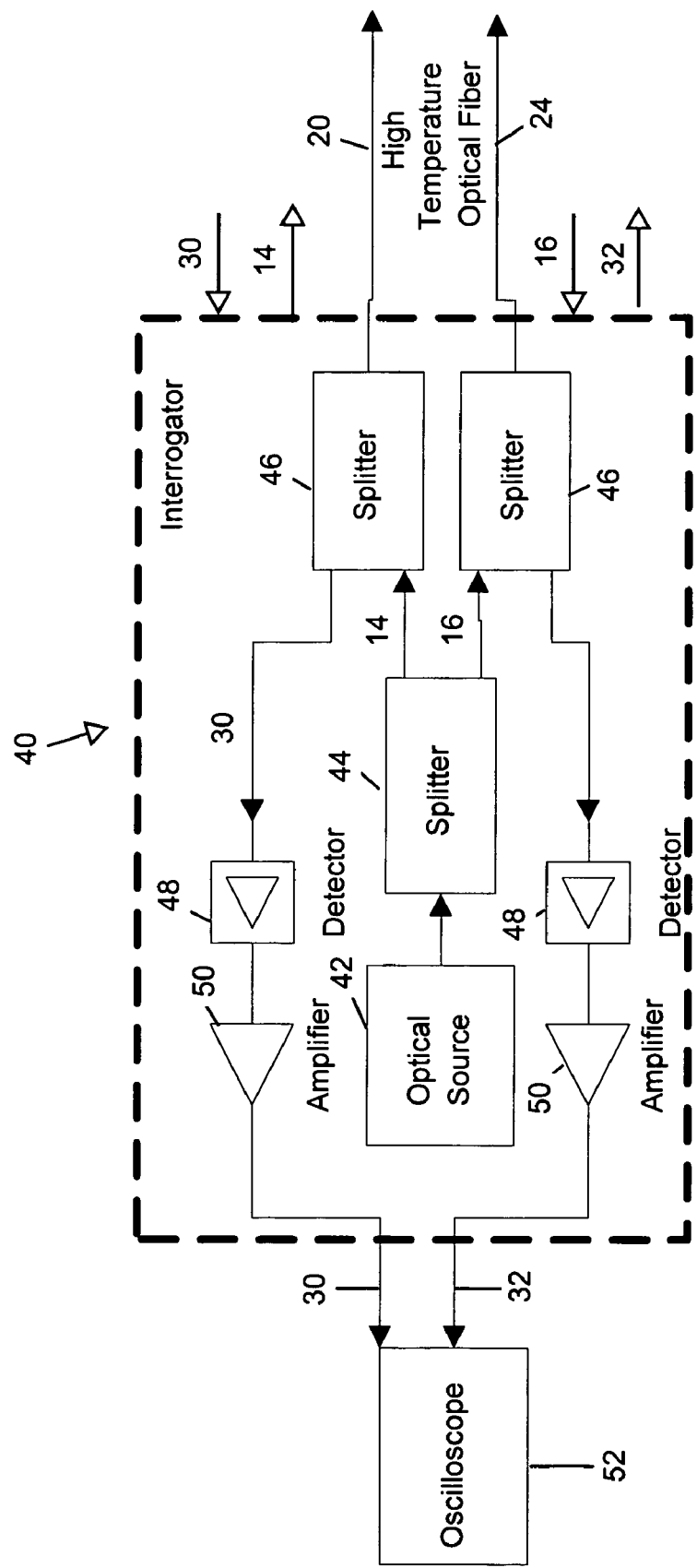
FIG. 8 is a schematic of the optical and electrical system operating the sensor of the present invention.

Referring to FIG. 8, a schematic for a system 40, which is hereinafter referred to as analog module 40, to transmit light, to receive reflected light pulses and to process the reflected light pulses is shown. Analog module 40 comprises optical source 42, which can emit light in narrow or broad ranges in the visible or invisible range, as discussed above. Light from optical source 42 is split by splitter 44 into two or more beams to be transported along optical fibers 20 and 24 to sensor 10, as shown in FIGS. 1 and 7. Alternative configurations include independent light sources for each channel as the input to splitter 46. Reflected light pulses 30, 32 are transported in the opposite direction back through optical fibers 20 and 24. Each reflected pulse 30, 32 then travels through splitter 46 to separate from beam 14, 16, respectively. Each reflected pulse is optionally optically amplified to increase the signal strength. Each reflected pulse 30, 32 is detected by optical detector 48 to convert the optical signal to electrical signals for data processing by electrical and electronic components. The converted electrical signals are optionally amplified by amplifier or op-amp 50 to increase their magnitudes or gains. These signals are also optionally conditioned through the use of electronic filters. In one embodiment, pulses 30 and 32 are viewed at oscilloscope 52, where the rise time, the fall time and the various widths of the pulses and delay time described above can be stored, viewed, and measured. When sensor 10 and analog module 40 are used to measure gaps Z between multiple moving or rotating objects, such as blades inside a jet engine, turbo charger or turbo machinery, the pulses from each blade can be stored in memory for processing or post-processing.

The data including pulses 30 and 32 can be processed by a number of methodologies and the present invention is not limited to any particular data processing technique. In accordance to one embodiment of the present invention, the data can be post-processed, i.e., the data is stored first, e.g., in a digital oscilloscope or other memory storage devices, or in accordance to another embodiment the data can be process in real-time. In a non-limiting method, the data coming from amplifiers 50 is cleaned and normalized to facilitate accurate measurements. As shown in FIG. 8, a digital oscilloscope is used to acquire and store the raw/unprocessed voltage data from amplifiers 50. The data can be digitized by an analog-digital converter either before or after reaching digital oscilloscope 52. The data representing reference pulses 30 is processed in the same way using the same calculations as the data representing reference pulses 32.

In one example of a processing methodology, the unprocessed data from oscilloscope 52 has the minimum value subtracted and is divided by the range to generate a normalized signal. A low pass digital filter is applied to remove high frequency noise and to smooth the sampling noise, which generally occurs during digitization, followed by subtraction from the output of a traveling minimum filter, which preferably is a very low frequency low pass filter. This subtraction removes very low frequency noise content, such as signal drift. This step is designed to minimize distortions caused by slow background variations in the signal. The signals from pulses 30 and pulses 32 are optionally synchronized together to enhance the visualization of the data. By comparing the conditioned data against the output of a running maximum filter, pulses representing blade 18 crossing beam 14, 16 or 34 can be identified.

At this time, a coarse measurement of the peak spacing can reject any spurious noise which may have gotten through the signal conditioning described above. The signal conditioning is completed and the system outputs smoothed data/pulses with the approximate times of blade crossing beam events, such as those shown in FIGS. 4, 5 and 6. As shown in these Figures, the horizontal-time axis is centered on the center of the pulse, which can be defined as the mid-point between two low (A-F), middle (B-E) or high (C-D) crossings of blade 18. These smoothed data/pulses can be analyzed to measure the features, such as rise time, fall time, pulse widths or "Delays", to ascertain gap Z, as discussed above.

Preferably, a field-programmable gate array (FPGA) is used to process the data collected from analog module 40 and sensor 10. An FPGA is an integrated circuit and is designed to be configured by the user after manufacturing. An FPGA is different from an application-specific integrated circuit (ASIC) in that a user can update an FPGA after it is shipped from the manufacturer, thereby enhancing the versatility of the tool. However, an ASIC, any other computational device, or any combination of such devices can be used, as well.

Figure 8A:
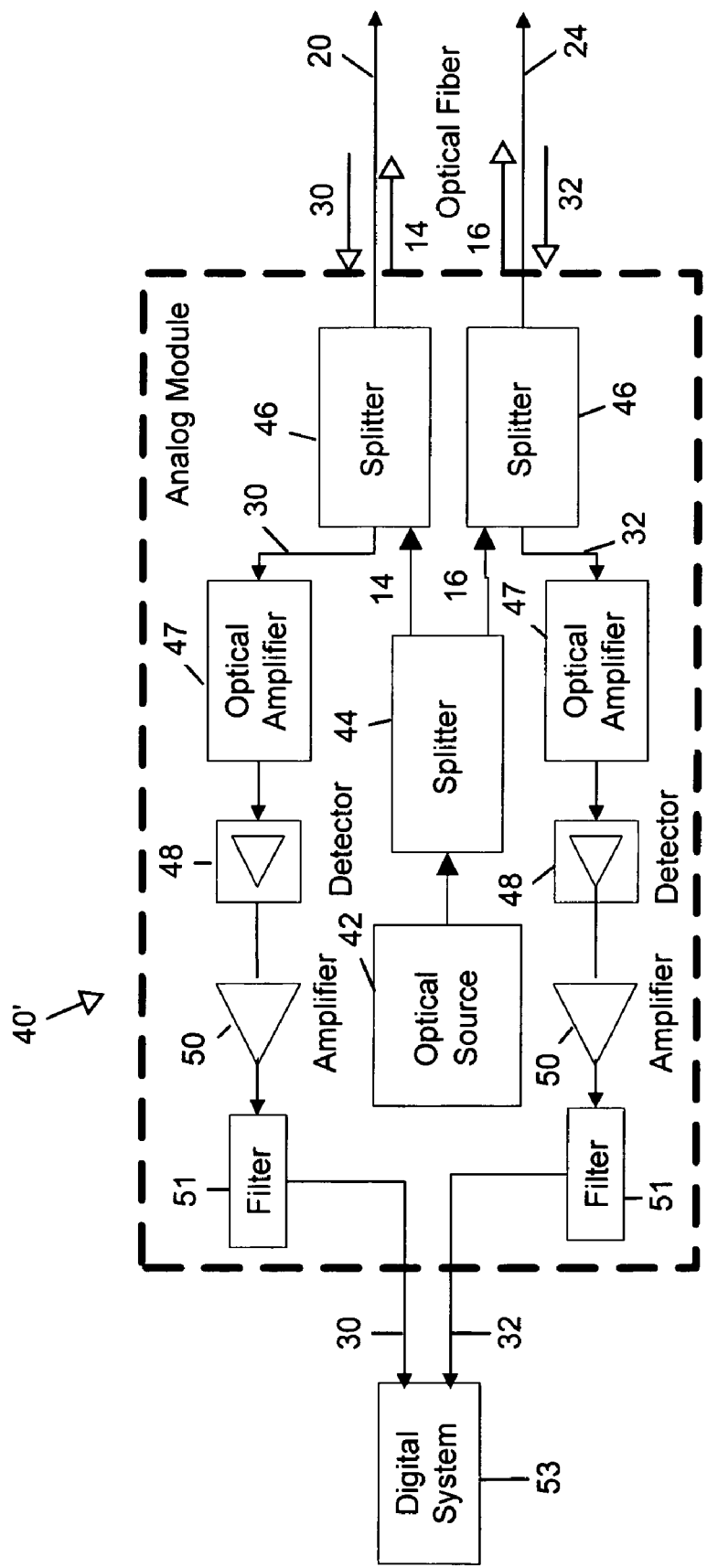
FIG. 8a is an alternate embodiment of the system shown in FIG. 8.
Figure 11:
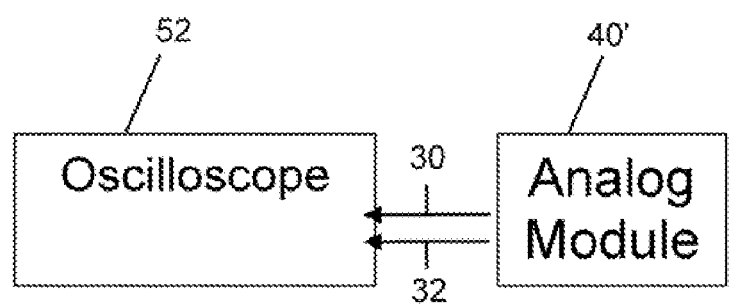
FIG. 11 is a schematic representation of an exemplary hardware to store the reflected light pulses received by the sensor of FIG. 1 for post-processing.

Referring to FIG. 8a, a schematic for another embodiment of analog module 40 is shown, which is hereinafter referred to as analog module 40', to transmit light, to receive reflected light pulses and to condition the reflected light pulses. Analog module 40' comprises optical source 42, which can emit light in narrow or broad ranges in the visible or invisible range, as discussed above. Light from optical source 42 is split by splitter 44 into two or more beams to be transported along optical fibers 20 and 24 to sensor 10, as shown in FIGS. 1 and 7. Alternative configurations include independent light sources for each channel as the input to splitter 46. Reflected light pulses 30, 32 are transported in the opposite direction back through optical fibers 20 and 24. Each reflected pulse 30, 32 then travels through splitter 46 to separate from beam 14, 16, respectively. Each reflected light pulse is optionally optically amplified by amplifier 47 to increase the signal strength. Each reflected pulse 30, 32 is detected by optical detector 48 to convert the optical signal to electrical signals for data processing by electrical and electronic components. The converted electrical signals are optionally amplified by amplifier or op-amp 50 to increase their magnitudes or gains. These signals are also optionally conditioned through the use of any combination of electronic filters 51 (e.g., low pass, high pass, bandpass) to reduce noise. In one embodiment the data is then transferred into a system 53 for digitizing and signal processing. In one embodiment shown in FIG. 11, pulses 30 and 32 from analog module 40' can also be viewed at oscilloscope 52, where the rise time, the fall time and the various widths of the pulses and delay time described above can be stored, viewed, and measured. When sensor 10 and analog module 40 are used to measure gaps Z between multiple moving or rotating objects, such as blades inside a jet engine, turbo charger or turbo machinery, the pulses from each blade can be stored in memory for processing or post-processing.

Figure 10:
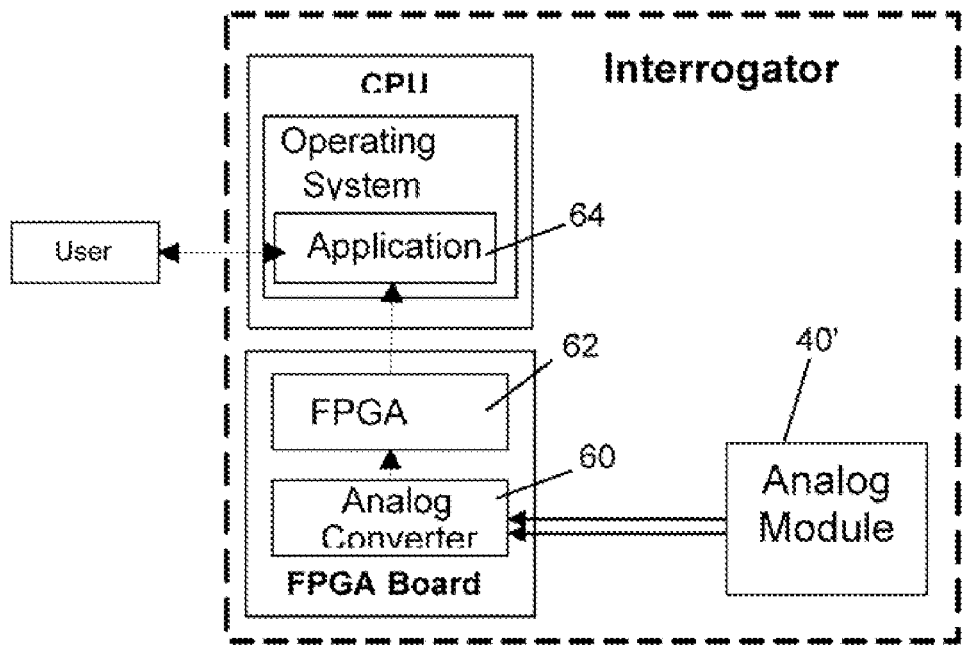
FIG. 10 is a schematic representation of an exemplary hardware to process the reflected light pulses received by the sensor of FIG. 1 in real time.

In another embodiment, the signals from analog module 40' can be processed in real time. In this embodiment, the signals are digitized and the signal processing is conducted in a system, one example of which is shown in FIG. 10. In a non-limiting method, FPGA chip 62 is used to process the data collected from analog module 40 or analog module 40' and sensor 10. As shown, a set of high speed analog to digital converters 60 is used to convert the output from analog module 40' into a digital data stream. This data stream is then input into FPGA chip 62 for data reduction. One example of the signal processing functions, which can occur in FPGA chip 62, is shown in the upper portion of FIG. 12, with a sample implementation shown in FIG. 13. In this example, the digitized data is aggregated to form average values which are then stored in a sample buffer. The number of digital data points ("raws") which are included to form each averaged and stored value ("samples") is determined by an estimate of the number of raws which will occur between a pair of adjacent pulses for a single channel (the "window size"). A coarse summing of these samples into "bins" is used to determine candidates for the beginning and end of possible pulses. At the end of the estimated blade window, the most probable pulse feature is analyzed to determine the pulse timings T(A) through T(F). This analysis is used to adaptively change the estimated window size thereby allowing the signal processor to lock in on the repeating blade pulses. The results of T(A) through T(F) for each channel are then passed to a software module 64, as shown in FIG. 10, (which may be implemented within the same hardware or different hardware) which calculates the difference and ratios discussed above to derive the clearance, Z, conducts any desired higher order calculations, and outputs the results to the user(s).

Referring again to FIG. 12, FPGA chip 62 processes the raw data and reduces the data collected for further processing. In the present embodiment, a preferred data processing technique involves the collection of reflected energy 30, 32, from beams 14, 16/34 in accordance with the internal clock of the CPU or FPGA chip 62. The internal clock is an internal timing device. Generally, a quartz crystal feeds the microprocessor or FPGA a constant flow of pulses. For example, a 100 MHz CPU receives 100 million pulses per second from the clock. A 2 GHz CPU gets two billion pulses per second. Similarly, in a communications device, a clock may be used to synchronize the data pulses between sender and receiver. Internal clocks of any frequency or speed can be used and the present invention is not limited thereto. Additionally multiple clocks can be used to conduct different elements of the processing at different rates, much like a modern computer has separate clocks for the CPU, RAM, and graphics cards. In the example shown in FIG. 12, a 100 MHz clock is used, and at each "tick" of this digital internal clock an analog measurement of the reflected energy from signal and reference pulses 30, 32 are recorded and digitized at step S01 preferably by analog to digital converter 60 (illustrated in FIG. 10). It is noted that the duration of a single pulse 30 or 32 generally span over a plurality of "ticks" from the internal clock of FPGA chip 62. Pulses 30 and 32 are identified and ascertained from the exemplary procedure described below.

After digitization, the raw data from pulses 30, 32 are aggregated at step S02. The raw data over a set of "n" number is summed and averaged, and the buffer is cleared for the next "n" number of raw data. The aggregated and averaged "sample" value is sent to a memory storage for later recall and comparison at step S03. Step S04 further reduces the data into "bin". At step S04, the pulses 30, 32 are identified and tracked from "bin" values, and approximate locations and widths of the potential pulses are stored; false readings are rejected. After the pulses are identified and tracked, in step S05 the timings of the pulses, such as T(A)–T(F), "Delays", and pulse widths at various markers (low, mid, high) are ascertained by conducting a careful analysis of the "samples" stored in step S03, guided by the approximate values determined in step S04. At step S05, the duration of a true pulse 30, 32 in terms of the number of "ticks" is also identified. At step S06, a "window" size, which is the interval between sequential reflected pulses on a given channel (e.g. the time between the arrival of blade 18 and the arrival of the next blade of the rotor at the reference channel) in terms of "ticks", is adjusted if necessary and the adjusted window is reiteratively fed back to step S03. Steps S01-S06 are preferably performed by FPGA chip 62. Steps S01 and S02 are performed at a very high frequency at the speed of the internal clock, but at a low level of complexity, i.e., data sampling and digitization. Step S03 is performed once per "sample" with decreasing frequency but increasing complexity. As further shown in FIG. 12, step S04 is preferably performed once per bin, and steps S05 and S06 are performed once per window (i.e. at the blade passing frequency). This methodology of data processing allows high sampling rate and selective processing of reduced data. In this example, no step is halted for the following steps to complete. For example, while step S03 is storing the data, S02 is simultaneously aggregating the raw values for the next "sample".

The pulse timings from step S05 are processed into timing ratios such as those discussed above in Eqs. (7)-(12), discussed above at step S07. The timing ratios are then run through a calibration module, which may contain conversions from timing ratios to width of gap Z, and higher order processing, which may perform the higher functions such as vibration detection and analysis, detection of foreign object impact or damage, blade fracture/fatigue, etc., described below, at steps S08 and S09, respectively, before being outputted to the users at step S10. Preferably, steps S07-S10 are processed by application 64 (shown in FIG. 10).

Figure 12:
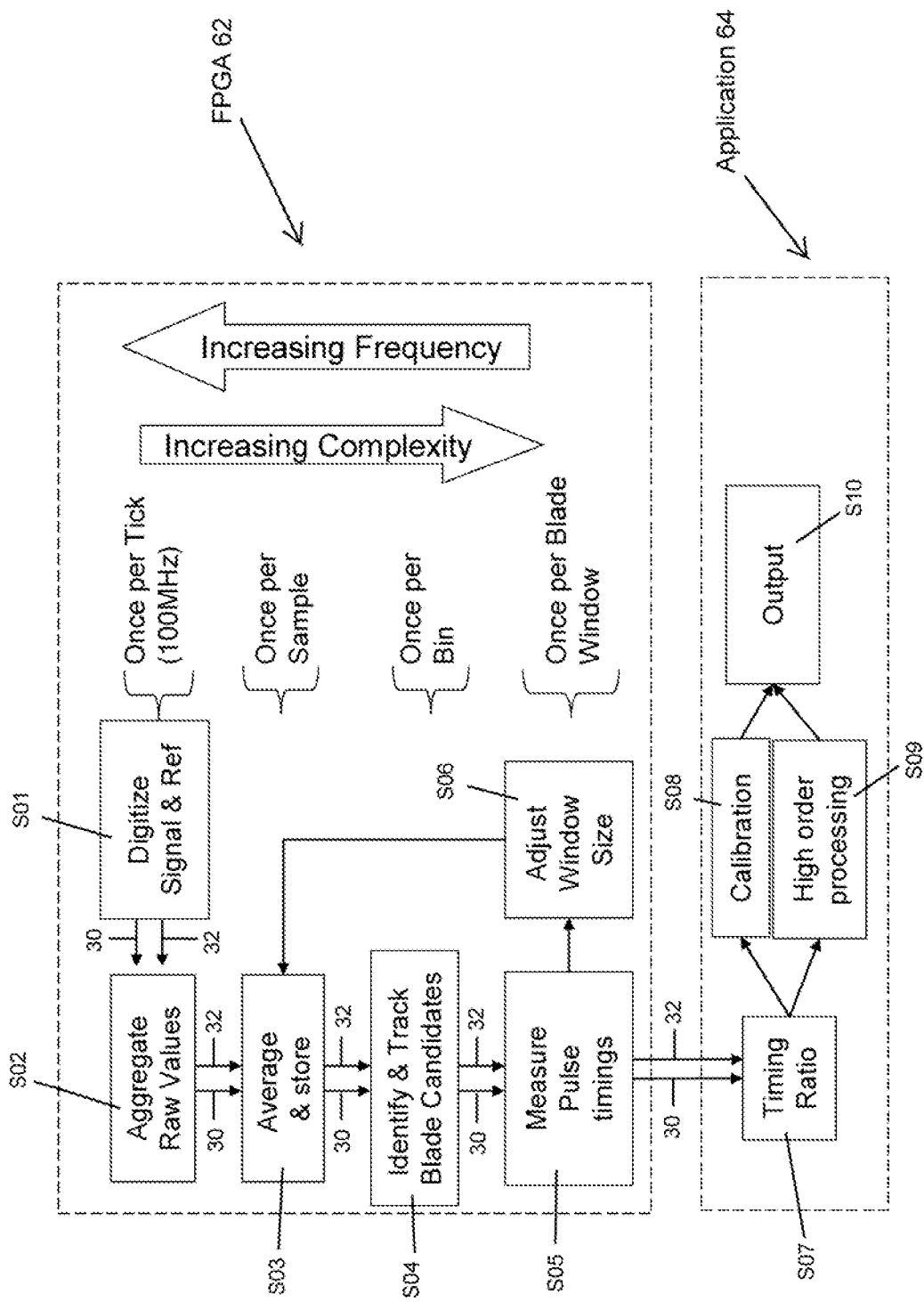
FIG. 12 is a schematic diagram illustrating the general methodology for processing the reflected light pulses in real time.
Figure 13:
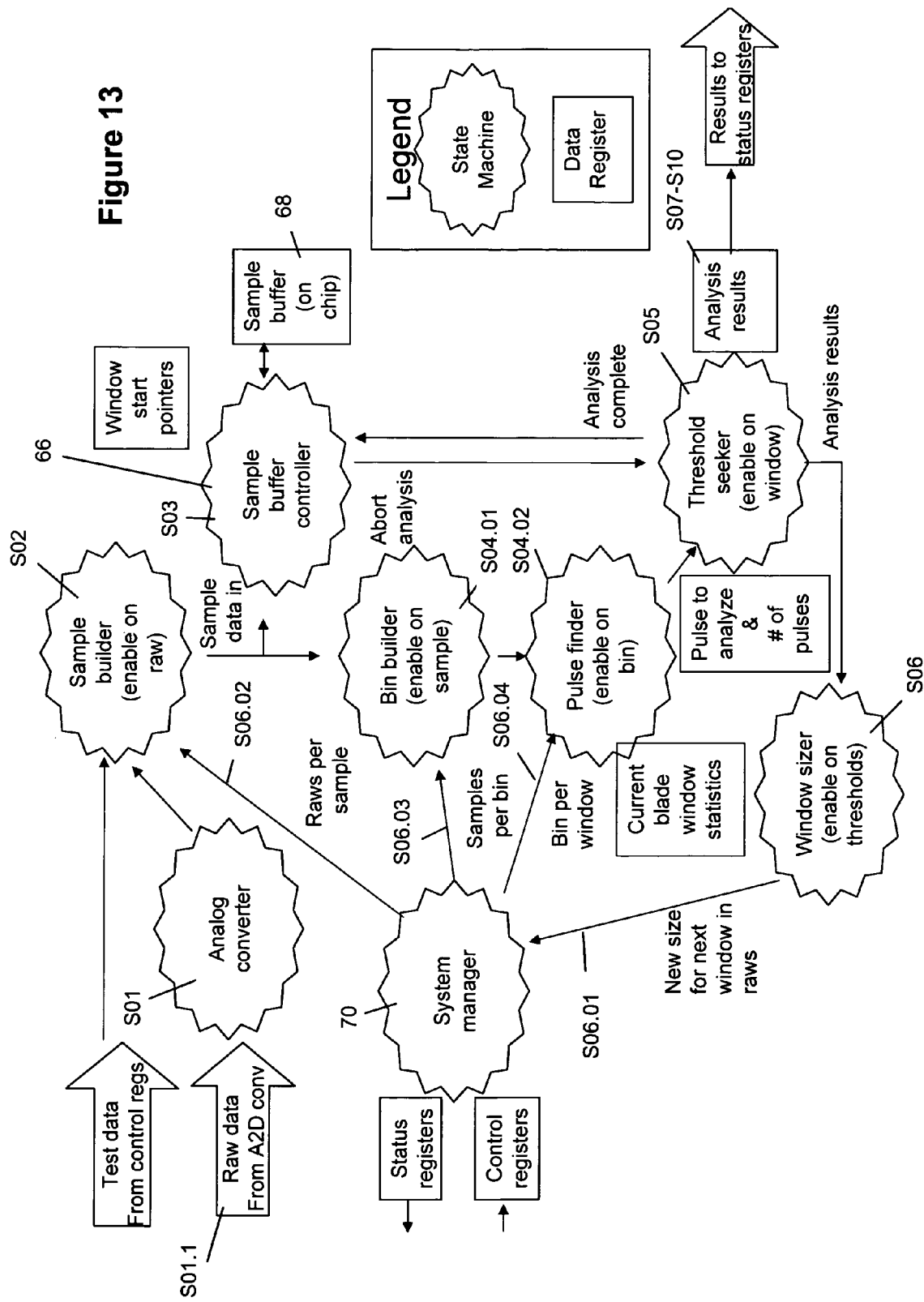
FIG. 13 is a schematic diagram of an exemplary, non-limiting specific method for executing the general methodology shown in FIG. 12.

FIG. 13 illustrates an exemplary, non-limiting methodology to execute the data reduction and processing shown in FIG. 12. Raw data at each "tick" from the digital internal clock is inputted at step S01.1 to an analog-digital converter at step S01. Step S02, the step of aggregation and averaging, is carried out by the sample builder. The aggregated and averaged sample values are sent to (i) the sample buffer controller 66 which performs step S03 and stores the aggregated and averaged values is a memory called a sample buffer 68 which resides on FPGA chip 62, and to (ii) the bin builder, which further reduces the data by aggregating and averaging the sample values. Step S04, identifying and tracking blade candidates, is performed by the pulse finder at step S04.2. The pulses are analyzed at step S05 by the threshold seeker by identifying a threshold of the pulse, which in this embodiment is preferably the mid point of the pulses, i.e., the zero value ("0") of the pulse as shown in FIG. 5. The pulse finder also finds the duration of the pulse in terms of the number of "ticks". With the threshold and the duration of the pulse, the threshold seeker at step S05 references sample buffer controller 66 and sample buffer 68 to recall the stored pulse samples and forward the stored pulse to the calculate the timing ratio at step S07.

Also shown in FIG. 13 is the reiterative step discussed above. After the threshold seeker has identified the duration of one blade window, this data is fed to the window sizer in step S06. The new window size is sent to system manager 70 in step S06.01, which in turn sends the information in terms of raw "ticks" to the sample builder in step S06.02, in terms of samples per pin to the bin builder in step S06.03 and in terms of bin per blade window in step S06.04 to the pulse finder. Also as shown, system manager 70 also sends the new size for the blade window to the status registers. Control registers may also input data to system manager 70 and test data to the sample builder.

It is noted that the data processing and data reduction described in FIGS. 12 and 13 are illustrative only, and the present invention is not limited to any particular data processing and reduction methodologies.

In one embodiment, sensor 10 is made from materials having low coefficient of thermal expansion, such as sapphire, glass, polycrystalline alumina, optical ceramic (available as ALON™ from the Surmet Corporation, zirconia, superalloys, or other materials, to minimize thermal expansion and contraction, as can be expected when sensor 10 is deployed in thermally extreme applications, such as jet engines and turbo-machineries. Thermal expansion and contraction can be further minimized when substantially all the components of sensor 10, such as lenses, lens holders, optical fibers, housing are made from the same material, e.g., sapphire. Preferably, sensor 10 is made from materials having a coefficient of thermal expansion of less than about $30 \times 10^{-6}/°$ C., more preferably less than about $10 \times 10^{-6}/°$ C., and most preferably less than about $1 \times 10^{-6}/°$ C.

The housing of sensor 10, window 27 and possibly the lenses 22, 26 and/or 38 can be made by the net shape molding process, where optical ceramic powder such as ALON™ is poured into molds and is then heated under pressure to form a monolithic piece. This net shape molded piece forms a single piece outer housing of sensor 10.

In another embodiment, the optical elements of sensor 10, such as lenses 22, 26 or 38, can be spring loaded to minimize the effects of thermal expansion or contraction, and vibrations caused by the moving or rotating member 18, Sensor 10 can also be deployed to measure gap Z between a stationary object 12 and a rotating smooth drum. The drum may have slit cutouts on its surface and sensor 10 can measure the reflecting pulses from the surface of the drum interrupted by the lack of reflections at the slit cutouts. Gap Z would be ascertainable based on the rise/fall time, widths and "Delay" of the interruptions. In yet another embodiment, the slit cutouts can be replaced by areas painted with a reflective or absorptive coating, or, inversely, the smooth drum can be painted with a reflective coating, except for a plurality of unpainted areas, so long as the reflectivity of the rotating object varies. In yet another embodiment the variations in reflectivity could be achieved through machining features which scatter light away from sensor 10.

Sensor 10 can be used to monitor a rotary machine, such as a jet engine or a turbo-machinery, for the entry of foreign objects. When large foreign objects, such as birds, enter a jet engine, the effects can be readily felt and catastrophic. However, smaller objects may not be felt. The smaller objects when they enter the jet engine may vary the rotating speed of rotating blades or may cause the blades to move closer or further away from the stationary engine shroud. These foreign objects may also cause the blades to move linearly substantially along the axis of rotation, discussed in the following paragraph. Sensor 10 can detect these changes and can issue warnings. Sensor 10 and its supporting systems can inform the operator of the jet engine or turbo-machinery to safely shut down and inspect the machine.

Figure 9:
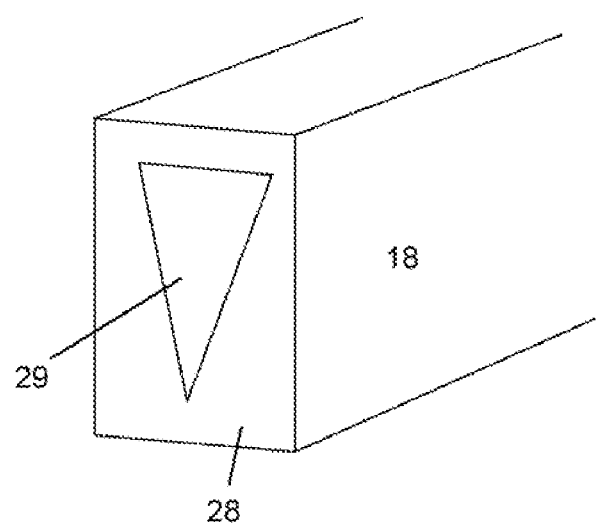
FIG. 9 is a perspective view of a tip of a moving or rotating member.

Referring to FIG. 9, another embodiment of the present invention that uses tip 28 of blade 18 is shown. Tip 28 comprises a tapered shape 29, which has a reflectance value that is different than the reflectance value of the rest of tip 28. The reflectance of tapered shape 29 can be higher or lower than the reflectance of the rest of tip 28. Since the width of tapered shape 29 is different at any location where reference beam 14 or signal beam 16 or 34 may cross it, tapered shape 29 produces a unique pulse where the beams crossed. Hence, if blade 18 moves in a direction normal to its rotational direction, i.e., along the axis of rotation, sensor 10 can detect this movement and, if appropriate, send a warning. Tapered shape 29 can be triangular as shown or curved or have any arbitrary shape, so long as its width is unique where the beams may cross it. Additionally rather than a single shape the tapered shape 29 may be formed by the combination of multiple features of fixed width the spacing of which varies along the tip 28.

Figure 14:
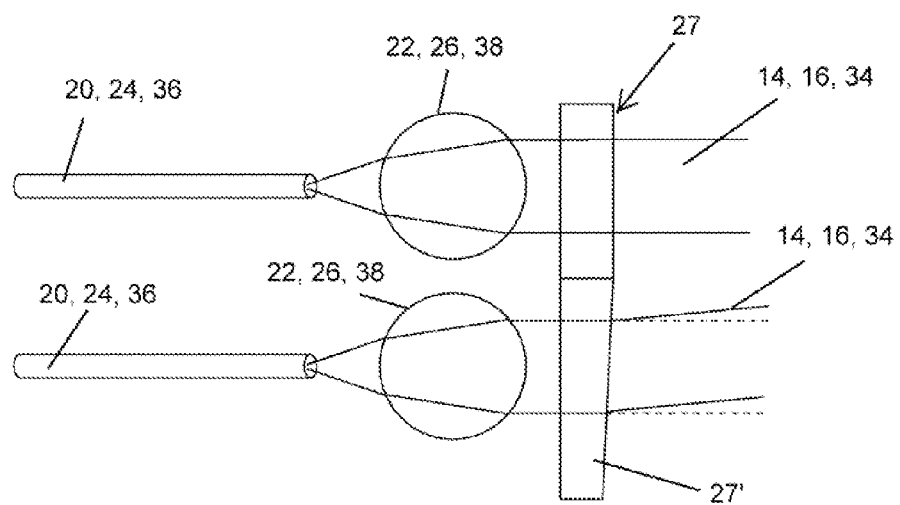
FIG. 14 is a schematic representation of the sensor of FIG. 1 with a distal window with elements omitted for clarity.

In another embodiment, beams 14 and 16/34 are aimed toward the axis of rotation of blade 18, and the beams are not necessarily parallel to each other. When these beams are so oriented, their paths are more orthogonal to tip 28 of blade 18, so that the reflected pulses 30 and 32 reflect more directly back at sensor 10. This orientation can reduce noise and increase signal strength. Furthermore, window 27 may have an angled face 27' can be removably or permanently placed in front of sensor 10 and before lenses 22, 26/38 to angle the beams, as shown in FIG. 14 with the angled beam shown in broken lines. As shown, angled portion 27' of window 27 redirects one or more of the beams, which could be any beam. It is noted that angled portion 27' can be positioned in front of any beam and any number of beams. Furthermore, a prism can be positioned at the distal end of sensor 10 to bend the beams at any desired angle, up to 90° or more, before the beams are incident on blade 18. The prism can be made integral to the window.

Figure 15:
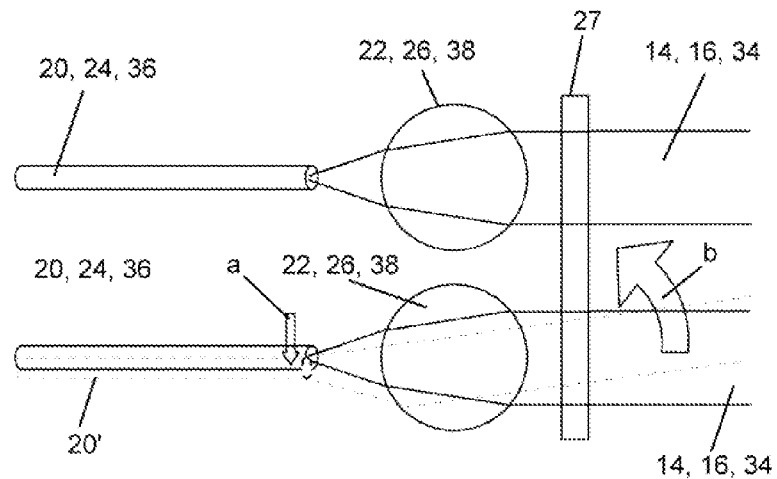
FIG. 15 is a schematic representation of the sensor of FIG. 1 with at least one offset optical fiber with elements omitted for clarity.

Alternately, fibers 20, 24/36 can be offset relative to lenses 22, 26/38 so that the light beam no longer travels through the center of lens 22, 26/38, as shown in FIG. 15. This would cause the light beam to shift angularly. The amount of offset in the vertical direction of an optical fiber in relation to the lens in FIG. 15 in direction "a" would angle the beam 14, 16/36 in direction "b", as shown in broken lines.

Figure 19:
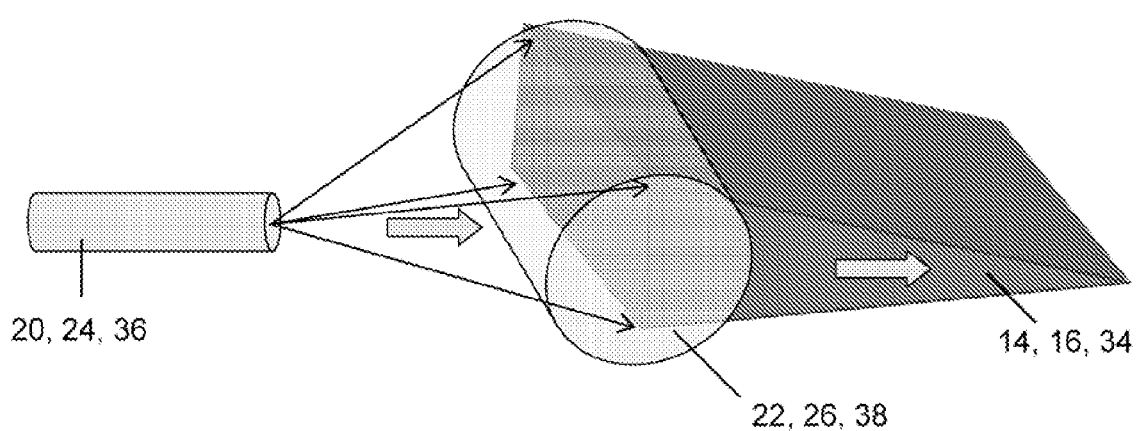
FIG. 19 illustrates the inventive sensor with an alternate cylindrical lens.

Also, lenses 22, 26 and 36 can be elliptical or spherical lenses. They can be replaced by asphereic or aspheric lenses, whose surfaces have a profile that is neither a portion of a sphere nor of a circular cylinder, cylindrical lenses, diffractive optical elements, polished or micromachined ends of the optical fibers, or photonic structures, such as photonic crystals. An advantage of cylindrical lenses is that when used to focus light beams these lenses provide non-circular light beams, as shown in FIG. 19. As shown, the resulting beam focused to a line of convergence, instead of a point of convergence. One advantage of having a line of convergence is that it may be sized and dimensioned to illuminate the entire tip 28 of blade 18. In general, suitable photonic structures include any structure that uses the geometrical structure of materials with features of the scale of or less than, the wavelength of light being controlled. Furthermore, the lenses and the protective window positioned at the distal end of sensor 10 discussed above can be made integral to each other. The window can be diffusion-bonded to form a seal at the distal end of sensor 10.

Beams 14, 16 or 34, which can be any visible or invisible electromagnetic radiation as discussed above, may also comprise a narrow frequency range. Beams 14, 16 or 34 can provide interference patterns with reflected pulses 30 or 32 to yield additional information, including the width of gap Z. In other words, one beam can form a Fabry-Perot cavity between stationary member 12 and rotating member 18, and an interference pattern can form between the light reflected at lens 22 or 26 (at stationary member 12) and the light reflected at tip 28.

The sensor system can also be used to passively gather ambient electromagnetic radiation from the environment and be used to measure the temperature of the rotary elements by analyzing the black body radiation which is captured.

In another embodiment of the present invention, one or more physical or contact sensor can be used in conjunction with remote, non-contact sensor 10 of the present invention. In one example, a temperature gage is included in sensor 10, so that the operating temperature can be ascertained. The measured temperature can be used to estimate the effects of temperature on the functions of sensor 10. A calibration curve, which includes the effects of operating temperature, can assist the user in adjusting the measured width of gap Z. Suitable temperature gages include, but are not limited to, thermocouples, thermistors, and thermal radiation gages such as an infrared temperature gage.

Figure 16:
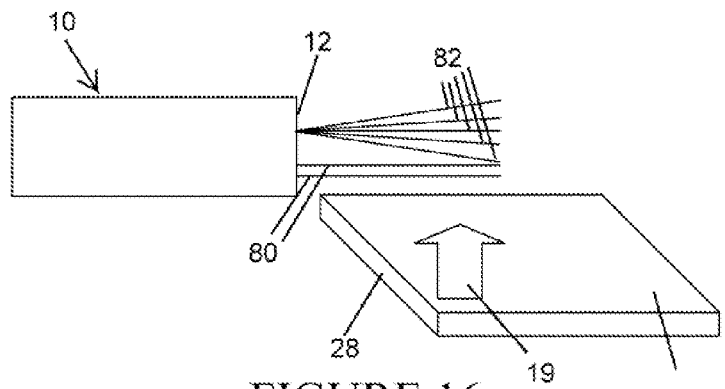
FIG. 16 is a schematic representation of another embodiment of the sensor of the present invention.

In another embodiment, gap measurements can be made by replacing focusing signal light beam 16 and collimated reference light beam 14 with a discrete collection of collimated beams oriented at different angles from the end face of sensor 10 or at stationary member 12. As illustrated in FIG. 16, this collection of beams comprises at least two collimated reference beams 80 directed substantially orthogonal to arrow 19 which indicates the direction of rotation of blade 18, similar to that discussed above, and collimated angled signal beams 82 which are angled relative to each other. While two reference beams and five signal beams are shown, any number of beams can be used, and the invention is not limited to any number of beams. The resulting profile of the reflected light beams is shown in FIG. 17.

Figure 17:
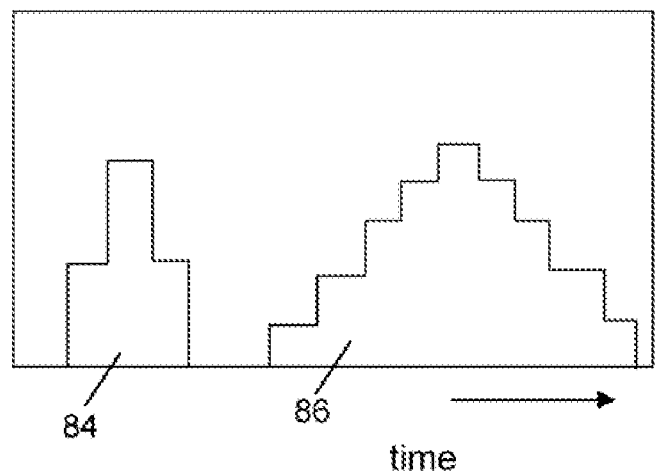
FIG. 17 is a schematic plot of the reflected light pulses from the sensor of FIG. 16.

The reflected "reference" pulse 84 is the feature schematically shown on the left side of FIG. 17, which is independent of clearance Z. When the distance between the beams is less than the width of tip 28, blade 18 enters the first beam to produce the first rise and produces the second rise in pulse 84 when blade 18 enters the second reference beam. When blade 18 exits the first and then the second reference beams, it produces the two-step fall time of pulse 84, as shown. Similarly, the reflected signal pulses 86 shown on the right side of FIG. 17 has a stepped profile, where each step represents a combined reflected pulse when blade 18 enters and leaves each signal collimated beam 82. The width of gap Z is directly proportional to the duration of pulse 86. In other words, increasing gap Z increases the width of pulse 86. This embodiment is somewhat similar to the relationship of gap Z and diverging signal beam 34 shown in FIG. 7 above. The stepped profile 86 may be connected as shown, or the steps may be separated from each other, depending on clearance Z or where blade 18 intercepts angled beams 82.

Figure 18:
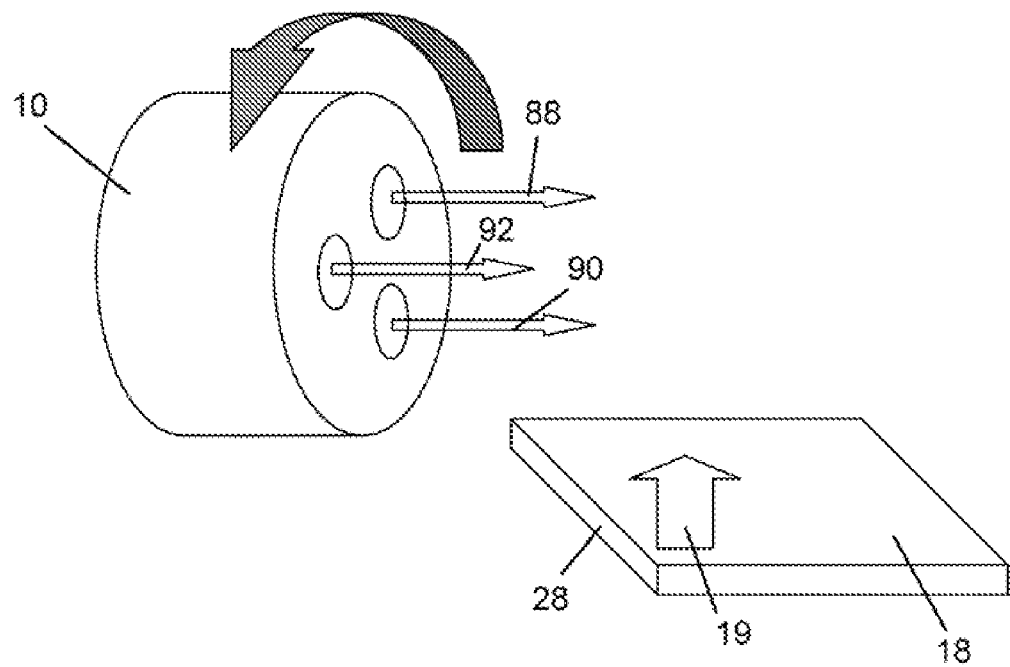
FIG. 18 is a schematic representation of another at least three light beam sensor of the present invention with elements omitted for clarity.

FIG. 18 demonstrates a method by which the use of three channels or light beams 88, 90, 92 or more can allow for the compensation of rotation during installation of the sensor probe. In one example, the three light beam embodiment, other than the applications discussed above in connection with FIG. 7, can be used when the thickness of blade 18 is not uniform, so that the "Delays" between the reflected signal pulse and the reflected reference pulse and the widths of these pulses are caused by the varying thickness of blade 18, as well as by the width of gap Z. In this configuration, at least two of the three beams are signal beams, and the two signal beams would consistently read significantly different values of gap Z, for all the blades 18 in the turbo-machine. The user can derive from these readings that one of the possible causes is that blade 18 has non-uniform thickness, and can rotate sensor 10, as shown, so that one of the signal beam and the reference beam are aligned to intersect the same section of blade 18. Alternatively, the knowledge of the amount of rotation can be used to mathematically correct for the rotation.

In another embodiment, a soft, sacrificial coating can be added to the distal end of sensor 10. This coating is designed to wear away when the engine or turbo-machine is started. This reduces the sensitivity of the positioning of sensor 10 when it is installed on stationary member 12. Furthermore, the housing or exterior of sensor 10 can be made from transparent material that is compatible with the environment. Additionally, after installation, the housing of probe 10 can be metalized to form a seal between the probe and the stationary member. Moreover, the thermal expansion/contraction properties of probe/sensor 10 can be matched to that of the moving or translating members to minimize the effects of temperature fluctuation.

In yet another embodiment of the present invention, the reflected reference pulse and reflected signal pulse from a single blade 18 can be unique due to the reflectance property of each blade tip 18, such that each blade has a unique "reflectance fingerprint". Each blade can be uniquely identified based on its reflected pulses. Practical applications of this advantage includes, but are not limited to, performing vibrational analysis to determine whether a particular blade 18 is cracked, fractured or fatigue since the structurally damaged blade tends to lag behind the other blades during operation. The arrival times of each blade and/or the space between the arrival times of the blade can be monitored. Gaps or delays in the arrival time suggest that one or more blades have been structurally compromised and their structural integrity can be verified. Due to their "reflectance fingerprint" the damaged blades can be identified. Another application is that blade flutter (the displacement of the blade tip relative to the rotation of the overall rotor, which results when the blade flexes as it rotates), or erosion (the wearing away of the blade tip over time) can also be determined.

In yet another embodiment of the invention, sensor 10 or one beam of sensor 10, can be used as a tachometer. Since sensor 10 is capable of recognizing the "reflectance fingerprint" or signature of a single blade, using the internal digital clock described above, application 64 shown in FIG. 10 can keep track the amount of time or number of "ticks" it takes for a single blade 18 to reappear and hence the rotational speed in revolutions per unit time (e.g., minute or second) of the engine or rotational machine. Alternatively, application 64 can simply count the total number of blades that pass by sensor 10 in one unit of time duration to ascertain the rotational speed of the engine.

In another embodiment, at least two sensors 10 can be used as a shaft torque sensor. For a jet engine that comprises a plurality of sets of rotor blades interspersed with sets of stator blades rotated by a central shaft, it is desirable to have a measurement of the amount of torque that the rotating shaft experiences during operation. In this embodiment, one sensor 10 is placed on one ring of rotor blades 18 and another sensor 10 is placed on a different ring of rotors. The initial positions of sensors 10 relative to each other in the circumferential direction and relative to an assigned/selected blade 18 are measured and stored. During operation of the jet engine, each sensor keeps track of its assigned blade 18 by identifying and recognizing the blade's "reflectance fingerprint" and more specifically its arrival time after one revolution. Application 64 compares the arrival times of the assigned blade 18 for each sensor. Any deviation of the relative arrival times indicates the amount of torque experienced by the central shaft of the jet engine. This torque can be measured in real time to yield the torque value during the transient start-up and the torque during steady state conditions.

In yet another embodiment of the present invention, due to the unique "reflectance fingerprint" sensor 10 can determine the vibrations of the jet engines or rotating machines. When a rotating machine vibrates, the rotational shaft can vibrate or move side-to-side, up-and-down or at various diagonal angles. Likewise, individual blades can twist or flex in relation to the shaft which they are mounted on. In one example, if the rotor blades are rotating in a counterclockwise direction (as view from the front), and the rotating shaft moves to right the arrival time of the rotor blades as measured by sensor 10 and application 64 would be delayed, and when the rotating shaft swings to the left, the arrival time would be early. This pattern of changing arrival times as measured by the present invention would indicate a vibration of the engine caused by side-to-side movements. Vibrations in other directions would cause a different arrival time patterns, and are detectable by the present invention.

With the above enhanced capabilities, sensor 10 can be deployed as an integral part of control loop application, which uses the information provided by sensor 10 and application 64 to control the operation and performance of the rotating machines or turbo-machineries. In one example, the width of gap Z can be used to shut down the machine or to enlarge or shrink stationary member 12, e.g., engine shroud. One way to change the size of stationary member 12 is to pass a fluid (liquid or gas) around stationary member 12, and to change the temperature of that fluid to expand or contract the stationary member, as necessary. The shaft torque and rotating speed information can be used to monitor the engine, and to provide warning messages or to make automated adjustments. Vibration information can be used to activate actuators, when available, to adjust the rotating shaft to counteract against movements thereof that had caused the vibrations.

Figure 20:
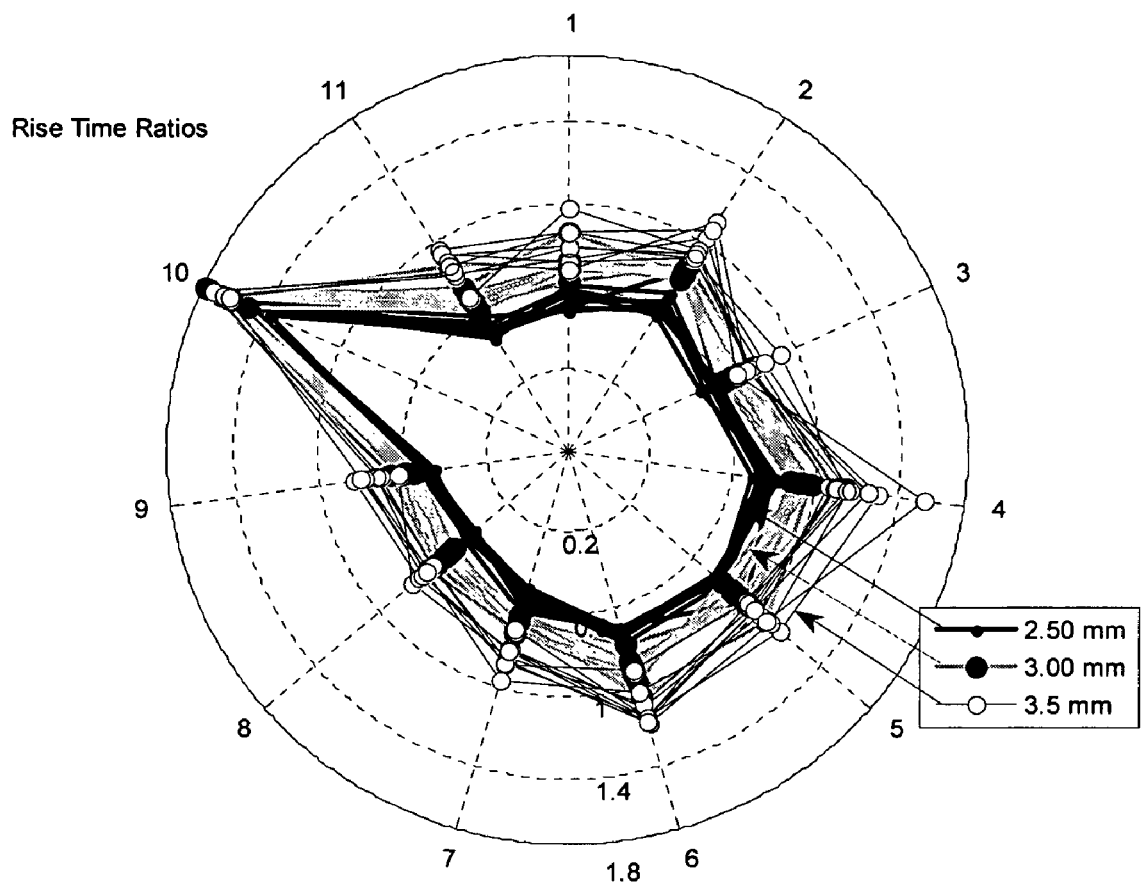
FIG. 20 is a plot in polar coordinates showing a result from a deployment of the sensor of the present invention on a turbo-machine.
Figure 21:
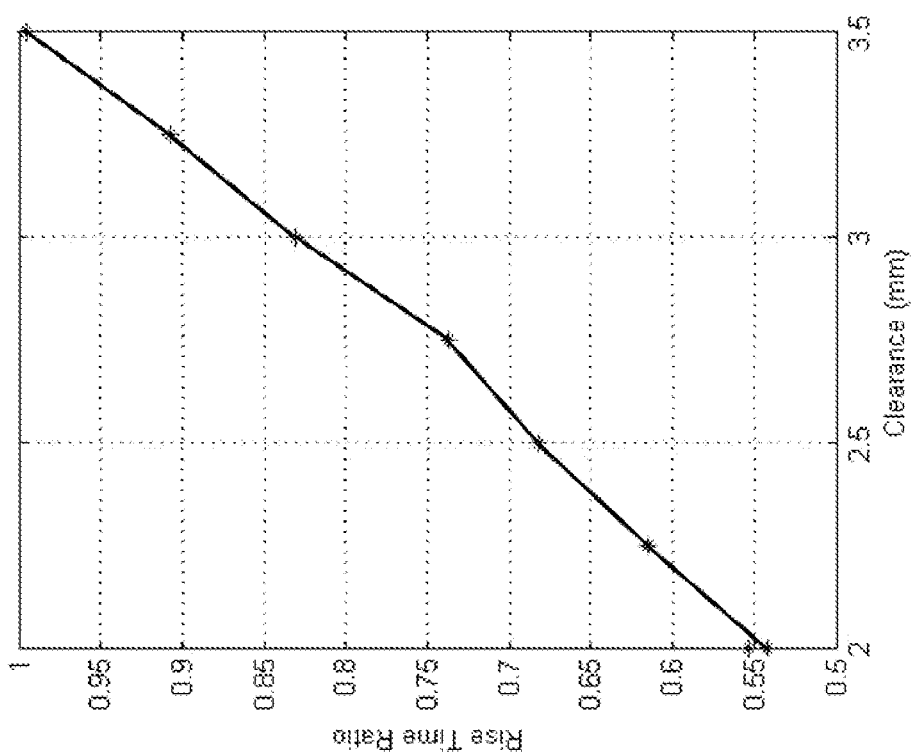
FIG. 21 is a plot in Cartesian coordinates showing a result from a deployment of the sensor of the present invention on a turbo-machine.

An inventive sensor substantially illustrated in FIGS. 1-3 along with the hardware and data processing methodology illustrated in FIGS. 8a, 10, 12 and 14 was mounted on a laboratory spin rig comprised of an electric motor spinning an eleven blade centrifugal turbocharger to monitor gap distance Z between the sensor and rotor blades being rotated at about 2674 rpm. FIG. 20 is a polar coordinate plot that shows the rise ratios between reflected pulses 30 and 32 and the width of gap Z. The data in FIG. 20 has been plotted on a polar coordinate system such that each angular position, ranging from 1 to 11, corresponds to all of the data from a specific blade. Therefore, the angular axis of FIG. 20 indicates blade identity ranging from blade 1 to blade 11. The radial axis of FIG. 20 indicates the ratio of the rise time from the signal pulse 32 to that of the reference pulse 30 (see Eq. 5) ranging from 0.2 unit to 1.8 units. The distinct line styles, as labeled in the legend, indicate the nominal clearance between sensor 20 and the outermost extent of the rotor blades, which is adjusted with a 1 μm accurate positioner. FIG. 20 shows the response of the system to variations in clearance which arise from manual adjustments (discriminated by line color), differences between the blades (such as the especially long blade #10), and rotor vibrations between successive revolutions (as shown by the radial spread of data points for a single line style on a single blade). FIG. 21 is a plot of the average values from FIG. 20, as well as other tests, showing the width of gap Z varying from 2.0 mm to 3.5 mm when the average rise time ratios (see Eq. 7) ranges from about 0.55 to about 1.0. The repeatability of the measurements of gap Z was held to be as low as within ±30 μm.

While it is apparent that the illustrative embodiments of the invention disclosed herein fulfill the objectives stated above, it is appreciated that numerous modifications and other embodiments may be devised by those skilled in the art. One such modification is that the system can maintain a historical record of prior measurements to determine trends in values over the life of a blade. Therefore, it will be understood that the appended claims are intended to cover all such modifications and embodiments, which would come within the spirit and scope of the present invention.

What is claimed is:

1. A method for ascertaining a gap between a stationary member and at least one translating member of a machine comprising the steps of:
   i. associating at least a reference beam and a signal beam of electromagnetic radiation to the stationary member and proximate to each other, wherein one of the two beams either converges or diverges at a rate which is different than that of the other beam;
   ii. projecting the reference beam and the signal beam across a gap between the stationary member and the at least one translating member toward the at least one translating member;
   iii. receiving a reference and signal pulse reflected by the at least one translating member when it intersects the reference and signal beam, respectively;
   iv. ascertaining one or more features from the reflected reference pulse and the reflected signal pulse; and
   v. determining a width of the gap using at least one of the features in step (iv).

2. The method of claim 1, wherein step (iv) or step (v) can be carried out in real time or post-processed.

3. The method of claim 1, wherein the reference beam comprises a collimated beam.

4. The method of claim 3, wherein the signal beam comprises a focused beam or a diverging beam, wherein the diameter of the signal beam varies across the gap and is determinable.

5. The method of claim 1, wherein at least one of the reference beam and signal beam comprises a non-circular beam.

6. The method of claim 1, wherein the one or more features from step (iv) comprise: at least one of a rise time of the pulses, a fall time of the pulses, a width of the pulses and a delay between the reflected reference pulse and the reflected signal pulse.

7. The method of claim 6, wherein in step (v) is determined by at least a ratio of one of the following reflected signal pulse to reflected reference pulse: rise time, fall time and pulse width.

8. The method of claim 6, wherein the reflected pulses are associated with at least one marker.

9. The method of claim 8, wherein the at least one marker includes a set of markers comprising at least a low marker, a high marker and a mid marker between the low and high marker.

10. The method of claim 9, wherein one set of markers is used for the rise time and another set of markers is used for the fall time.

11. The method of claim 10, wherein the width of the pulses is defined between corresponding members of the set of markers.

12. The method of claim 1 further comprising step (vi) controlling the effects of temperature fluctuations.

13. The method of claim 1, wherein the at least one translating member comprises one of the following:
   a. at least one rotating blade with a turbo-machine; and
   b. a rotating drum or cylinder having at least one region with a reflectance that is different from the rest of the drum.

14. The method of claim 1 wherein steps (i)-(iii) further include using a third beam, which either converges or diverges at a rate different from the rate of the reference and signal beams.

15. The method of claim 1 further comprising step (vii) ascertaining whether the at least one translating member moves in a direction parallel to the axis of rotation by providing on a tip of the at least one translating member a region of reflectivity that is different than the rest of the tip.

16. The method of claim 1, wherein the beams are directed toward an axis of rotation of the at least one translating member.

17. The method of claim 1 further comprising the step of (vii) identifying a reflectance fingerprint of said at least one translating member.

18. The method of claim 17 wherein step (vii) further comprises identifying said at least one translating member from a plurality of translating members using said at least one translating member's reflectance fingerprint.

19. The method of claim 17 further comprising the step of (viii) monitoring said reflectance fingerprint to monitor the structural integrity of said at least one translating member.

20. The method of claim 1 further comprising at least one of the following steps
   (ix) conducting vibration analysis of the machine;
   (x) detecting foreign object impacting the machine;
   (xi) determining a rotational speed of the machine;
   (xii) determining a torque on a rotational shaft to which the at least one translating member is mounted; or
   (xiii) controlling a performance or an operation of the machine, which includes a control loop application using the width of the gap from step (v), a vibration analysis, a shaft torque analysis or a rotational speed analysis obtainable from step (iii).

21. A method for ascertaining a gap between a stationary member and at least one translating member comprising the steps of:
   i. associating at least a signal beam of electromagnetic radiation to the stationary member;
   ii. projecting the signal beam across a gap between the stationary member and the at least one translating member toward the at least one translating member, wherein a diameter of the signal beam varies across the gap;
   iii. receiving a signal pulse reflected by the at least one translating member when it intersects the signal beam, wherein a duration of the pulse is related to a width of the gap;
   iv. ascertaining a speed of at least one translating member and a thickness of the at least one translating member; and
   iv. determining a width of the gap using the duration of the pulse and the speed and thickness of the at least one translating member.

* * * * *